(12) United States Patent
Pasternak

(10) Patent No.: US 9,355,004 B2
(45) Date of Patent: May 31, 2016

(54) INSTALLING MONITORING UTILITIES USING UNIVERSAL PERFORMANCE MONITOR

(75) Inventor: Michael Pasternak, Raanana (IL)

(73) Assignee: Red Hat Israel, Ltd., Raanana (IL)

(*) Notice: Subject to any disclaimer, the term of this patent is extended or adjusted under 35 U.S.C. 154(b) by 1004 days.

(21) Appl. No.: 12/898,582

(22) Filed: Oct. 5, 2010

(65) Prior Publication Data

US 2012/0084413 A1    Apr. 5, 2012

(51) Int. Cl.
G06F 15/177    (2006.01)
G06F 11/30     (2006.01)
G06F 11/34     (2006.01)

(52) U.S. Cl.
CPC ........ *G06F 11/3093* (2013.01); *G06F 11/3466* (2013.01)

(58) Field of Classification Search
USPC ........................................................ 709/221
See application file for complete search history.

(56) References Cited

U.S. PATENT DOCUMENTS

| | | | |
|---|---|---|---|
| 4,764,863 | A | 8/1988 | Siverthorn et al. |
| 5,793,753 | A | 8/1998 | Hershey et al. |
| 5,974,237 | A | 10/1999 | Shurmer et al. |
| 6,085,243 | A * | 7/2000 | Fletcher et al. ............... 709/224 |
| 6,093,215 | A | 7/2000 | Buxton et al. |
| 6,131,162 | A | 10/2000 | Yoshiura et al. |
| 6,282,712 | B1 * | 8/2001 | Davis et al. ................... 717/170 |
| 6,499,105 | B1 | 12/2002 | Yoshiura et al. |
| 6,799,147 | B1 | 9/2004 | Balasubramanian et al. |
| 6,918,038 | B1 | 7/2005 | Smith et al. |
| 6,925,085 | B1 | 8/2005 | Krishna et al. |
| 7,000,150 | B1 | 2/2006 | Zunino et al. |
| 7,162,638 | B2 | 1/2007 | Yoshihiro et al. |
| 7,171,021 | B2 | 1/2007 | Yoshida et al. |

(Continued)

FOREIGN PATENT DOCUMENTS

WO    WO 2010020101    2/2010

OTHER PUBLICATIONS

Tulloch, Mitch, et al., "Tip: Use Windows PowerShell to Monitor System Performance", retrieved May 12, 2010 from TechNet Magazine http://technet.microsoft.com/en-us/magazine/ee872428.aspx, 1 page, excerpt from Windows 7 Resource Kit, published Oct. 7, 2009, Microsoft Corporation.

(Continued)

*Primary Examiner* — Hua Fan
(74) *Attorney, Agent, or Firm* — Lowenstein Sandler LLP

(57) ABSTRACT

A universal performance monitor includes an abstraction layer for managing multiple disparate monitoring tools on one or more computing devices. During runtime of the universal performance monitor on a first computing device, the universal performance monitor establishes a secure channel between the first computing device and a second computing device. The universal performance monitor queries the second computing device via the secure channel to determine whether the second computing device includes a specified monitoring tool. Upon determining that the second computing device does not include the specified monitoring tool, the universal performance monitor causes the second computing device to obtain the specified monitoring tool from a designated location, to install the specified monitoring tool with a particular configuration, to execute the specified monitoring tool and to redirect an output of the specified monitoring tool to the first computing device via the first secure channel.

19 Claims, 24 Drawing Sheets

(56) References Cited

U.S. PATENT DOCUMENTS

| | | | |
|---|---|---|---|
| 7,246,156 B2* | 7/2007 | Ginter et al. | 709/217 |
| 7,299,277 B1* | 11/2007 | Moran et al. | 709/224 |
| 7,313,248 B2 | 12/2007 | Tonisson | |
| 7,398,307 B2 | 7/2008 | Dorland | |
| 7,523,191 B1 | 4/2009 | Thomas | |
| 7,747,738 B2 | 6/2010 | Ellisor, Jr. | |
| 7,779,119 B2* | 8/2010 | Ginter et al. | 709/224 |
| 7,865,764 B2 | 1/2011 | Jester | |
| 7,904,472 B1 | 3/2011 | Karnik | |
| 7,975,045 B2 | 7/2011 | Underwood | |
| 8,000,345 B2 | 8/2011 | Blackford et al. | |
| 8,024,459 B2 | 9/2011 | Robbins et al. | |
| 8,103,762 B2 | 1/2012 | Duberry | |
| 8,145,742 B1* | 3/2012 | Parker et al. | 709/224 |
| 8,185,651 B2* | 5/2012 | Moran et al. | 709/235 |
| 8,190,903 B2 | 5/2012 | Nayak | |
| 8,219,663 B2* | 7/2012 | Faraldo, II | 709/224 |
| 8,239,709 B2 | 8/2012 | Hom et al. | |
| 8,254,698 B2 | 8/2012 | Kantor et al. | |
| 8,321,863 B2* | 11/2012 | Yamaguchi et al. | 718/1 |
| 8,332,509 B2 | 12/2012 | Robertson et al. | |
| 8,413,144 B1 | 4/2013 | Manmohan et al. | |
| 8,527,982 B1 | 9/2013 | Sapuntzakis et al. | |
| 8,582,567 B2 | 11/2013 | Kurapati et al. | |
| 2001/0034839 A1 | 10/2001 | Karjoth et al. | |
| 2002/0059327 A1 | 5/2002 | Starkey | |
| 2002/0099946 A1 | 7/2002 | Herbert | |
| 2002/0107958 A1* | 8/2002 | Faraldo, II | 709/224 |
| 2002/0146123 A1 | 10/2002 | Tian | |
| 2002/0162059 A1 | 10/2002 | McNeely et al. | |
| 2002/0165954 A1* | 11/2002 | Eshghi et al. | 709/224 |
| 2003/0023963 A1* | 1/2003 | Birkholz et al. | 717/172 |
| 2003/0233366 A1 | 12/2003 | Kesselman et al. | |
| 2004/0153825 A1 | 8/2004 | Morimoto | |
| 2005/0086195 A1 | 4/2005 | Tan et al. | |
| 2005/0160045 A1 | 7/2005 | Watanabe et al. | |
| 2005/0182969 A1* | 8/2005 | Ginter et al. | 713/201 |
| 2005/0216830 A1 | 9/2005 | Turner et al. | |
| 2005/0256893 A1 | 11/2005 | Perry | |
| 2006/0005088 A1 | 1/2006 | Zeng et al. | |
| 2006/0041561 A1 | 2/2006 | Singer | |
| 2006/0064486 A1 | 3/2006 | Baron et al. | |
| 2006/0085543 A1* | 4/2006 | Hrastar et al. | 709/224 |
| 2006/0085790 A1 | 4/2006 | Hintermeister et al. | |
| 2006/0112175 A1 | 5/2006 | Sellers et al. | |
| 2006/0123133 A1* | 6/2006 | Hrastar | 709/238 |
| 2006/0178918 A1 | 8/2006 | Mikurak | |
| 2006/0179058 A1 | 8/2006 | Bram et al. | |
| 2006/0179432 A1 | 8/2006 | Wallinga et al. | |
| 2006/0195886 A1 | 8/2006 | Ashley | |
| 2006/0218364 A1 | 9/2006 | Kitamura | |
| 2006/0265625 A1 | 11/2006 | Dubois et al. | |
| 2007/0016429 A1 | 1/2007 | Bournas et al. | |
| 2007/0094367 A1 | 4/2007 | Esfahany et al. | |
| 2007/0136024 A1 | 6/2007 | Moser et al. | |
| 2007/0143338 A1 | 6/2007 | Wang et al. | |
| 2007/0174410 A1* | 7/2007 | Croft et al. | 709/208 |
| 2007/0294369 A1* | 12/2007 | Ginter et al. | 709/217 |
| 2008/0028370 A1 | 1/2008 | Lewallen et al. | |
| 2008/0098454 A1* | 4/2008 | Toh | 726/1 |
| 2008/0134340 A1 | 6/2008 | Ueda et al. | |
| 2008/0189546 A1 | 8/2008 | Yoon | |
| 2008/0208806 A1 | 8/2008 | Dalfo et al. | |
| 2008/0209033 A1* | 8/2008 | Ginter et al. | 709/224 |
| 2008/0222414 A1 | 9/2008 | Wang | |
| 2008/0260147 A1 | 10/2008 | Shin | |
| 2008/0275973 A1 | 11/2008 | Toeroe | |
| 2008/0301803 A1 | 12/2008 | Ontaneda et al. | |
| 2009/0024994 A1 | 1/2009 | Kannan et al. | |
| 2009/0077383 A1 | 3/2009 | de Monseignat et al. | |
| 2009/0193497 A1 | 7/2009 | Kikuchi | |
| 2009/0199012 A1 | 8/2009 | Yamada et al. | |
| 2009/0199047 A1 | 8/2009 | Vaitheeswaran et al. | |
| 2009/0265707 A1 | 10/2009 | Goodman et al. | |
| 2009/0271504 A1* | 10/2009 | Ginter et al. | 709/220 |
| 2009/0288084 A1 | 11/2009 | Astete et al. | |
| 2009/0300437 A1 | 12/2009 | Bhame | |
| 2009/0328143 A1 | 12/2009 | Ming | |
| 2010/0023598 A9* | 1/2010 | Ginter et al. | 709/217 |
| 2010/0064039 A9* | 3/2010 | Ginter et al. | 709/224 |
| 2010/0094981 A1* | 4/2010 | Cordray et al. | 709/222 |
| 2010/0125844 A1 | 5/2010 | Mousseau et al. | |
| 2010/0131638 A1 | 5/2010 | Kondamuru | |
| 2010/0131769 A1 | 5/2010 | Homma | |
| 2010/0198875 A1 | 8/2010 | Rieger et al. | |
| 2010/0268957 A1 | 10/2010 | Suzuki et al. | |
| 2010/0310132 A1 | 12/2010 | Perez Gonzalez | |
| 2010/0322252 A1* | 12/2010 | Suganthi et al. | 370/395.53 |
| 2010/0333172 A1 | 12/2010 | Jiang | |
| 2011/0145217 A1 | 6/2011 | Maunder et al. | |
| 2011/0161928 A1* | 6/2011 | Sangra et al. | 717/115 |
| 2011/0191351 A1 | 8/2011 | Chao et al. | |
| 2011/0209160 A1 | 8/2011 | Venkatachalam | |
| 2011/0238792 A1* | 9/2011 | Phillips et al. | 709/220 |
| 2011/0302651 A1 | 12/2011 | Bates et al. | |
| 2012/0011408 A1 | 1/2012 | Swamy et al. | |
| 2012/0047194 A1 | 2/2012 | Stergiou et al. | |
| 2012/0084436 A1 | 4/2012 | Pasternak | |
| 2012/0084608 A1 | 4/2012 | Pasternak | |
| 2012/0084780 A1 | 4/2012 | Pasternak | |

OTHER PUBLICATIONS

Managing Network Monitor from the command line; Updated on Jan. 21, 2005; Microsoft; http://technet.microsoft.com/en-us/library/cc782726(v=ws.10).aspx.

USPTO, Office Action for U.S. Appl. No. 12/898,480 mailed on Jun. 20, 2012.

USPTO, Final Office Action for U.S. Appl. No. 12/898,480 mailed on Jan. 3, 2013.

USPTO, Advisory Action for U.S. Appl. No. 12/898,480 mailed Mar. 14, 2013.

USPTO, Office Action for U.S. Appl. No. 12/898,526 mailed Mar. 19, 2013.

USPTO, Office Action for U.S. Appl. No. 12/898,526 mailed Nov. 5, 2013.

USPTO, Office Action for U.S. Appl. No. 12/898,428 mailed Mar. 28, 2013.

USPTO, Office Action for U.S. Appl. No. 12/898,428 mailed Oct. 18, 2013.

Office Action for U.S. Appl. No. 12/898,480 mailed on Apr. 24, 2014.

Final Office Action for U.S. Appl. No. 12/898,480 mailed on Nov. 17, 2014.

Advisory Action for U.S. Appl. No. 12/898,480 mailed Feb. 19, 2015.

Office Action for U.S. Appl. No. 12/898,480 mailed on May 6, 2015.

Notice of Allowance for U.S. Appl. No. 12/898,480 mailed on Oct. 14, 2015.

Final Office Action for U.S. Appl. No. 12/898,526 mailed Jun. 3, 2014.

Office Action for U.S. Appl. No. 12/898,526 mailed Oct. 1, 2014.

Office Action for U.S. Appl. No. 12/898,526 mailed May 14, 2015.

Notice of Allowance for U.S. Appl. No. 12/898,526 mailed Oct. 15, 2015.

Notice of Allowance for U.S. Appl. No. 12/898,428 mailed Apr. 16, 2015.

* cited by examiner

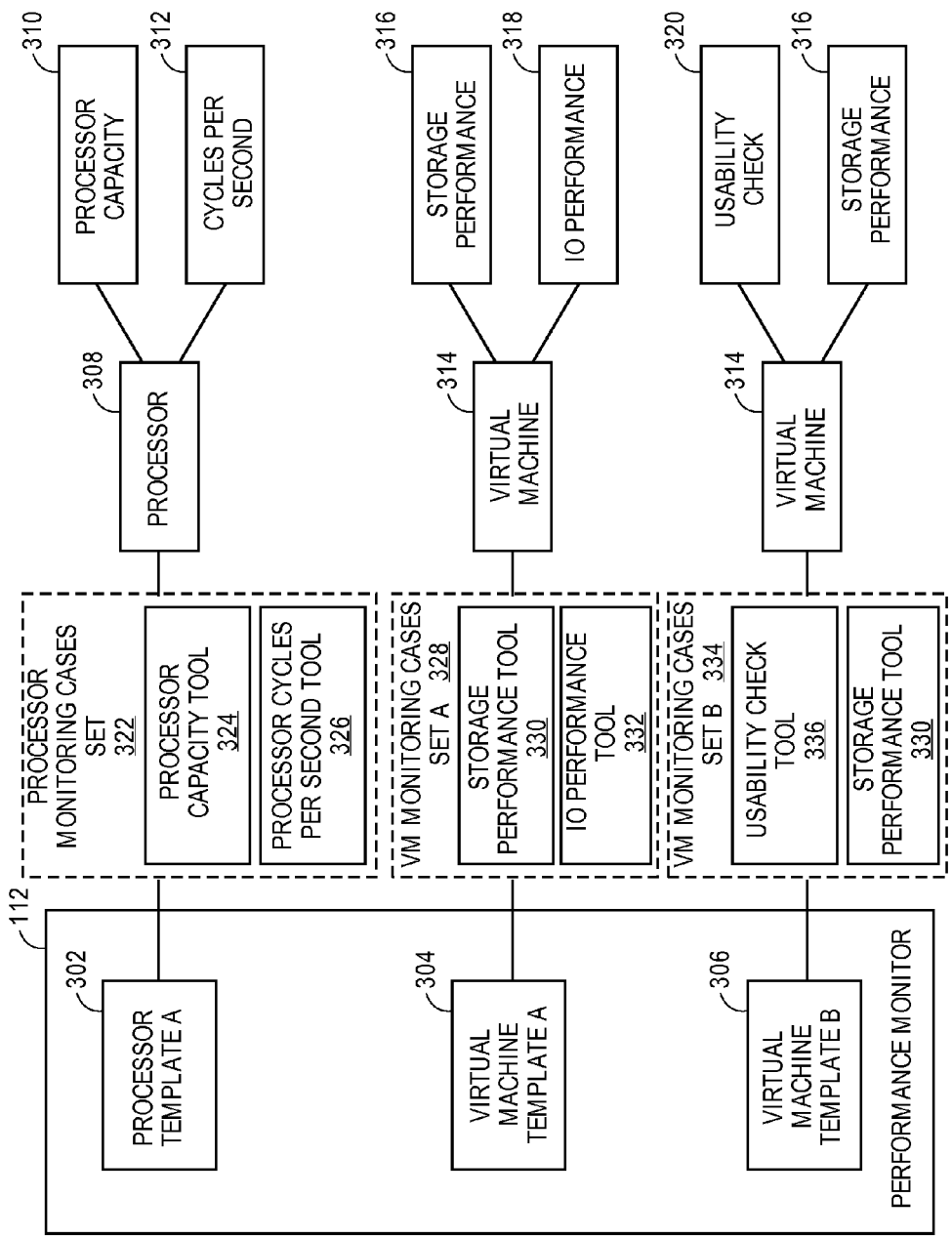

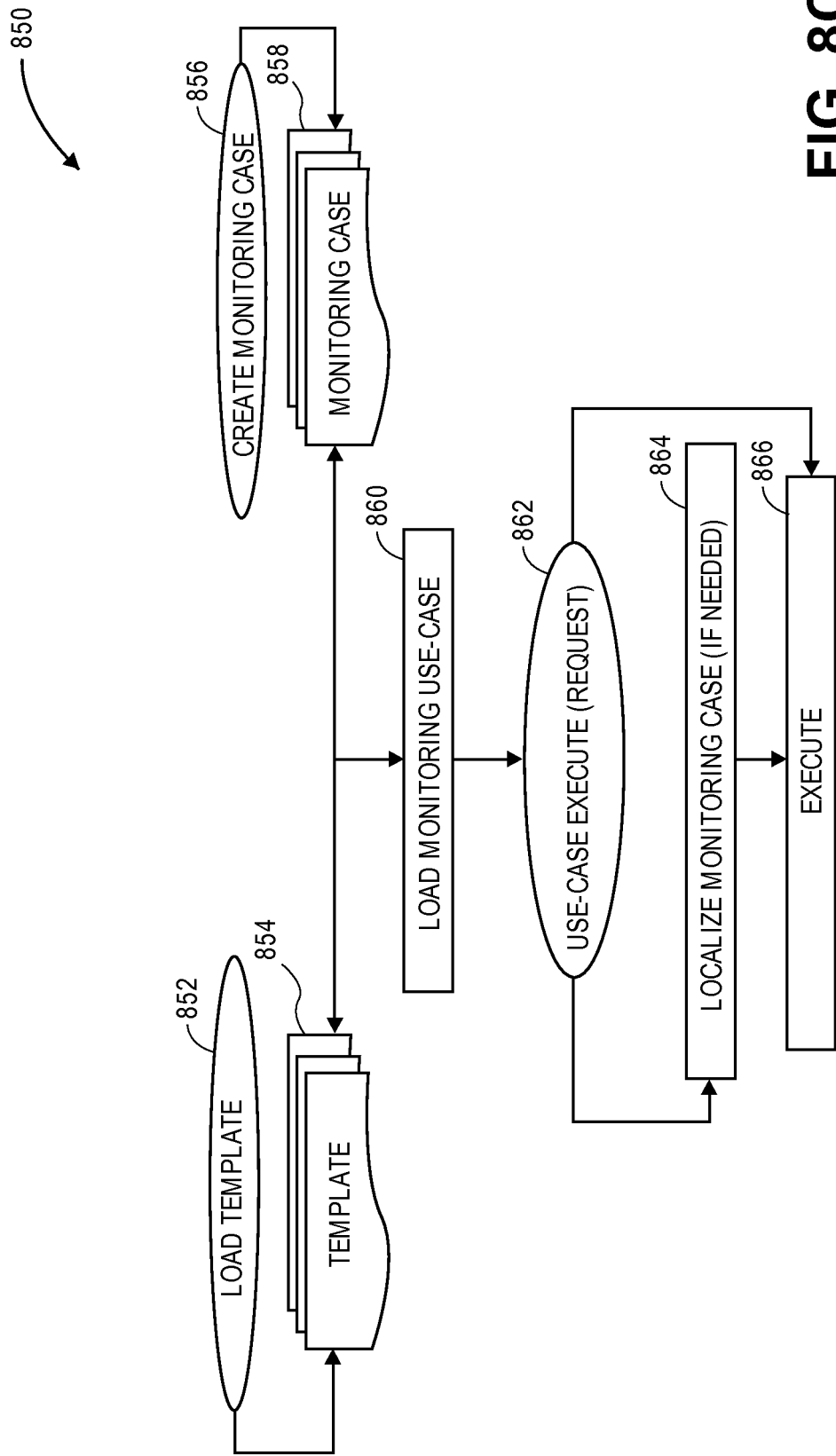

INSTALLING MONITORING UTILITIES USING UNIVERSAL PERFORMANCE MONITOR

RELATED APPLICATIONS

The present application is related to co-filed U.S. patent application Ser. No. 12/898,526 entitled "Mechanism for Performing Verification of Template Integrity of Monitoring Templates Used for Customized Monitoring of System Activities", filed Oct. 5, 2010, and U.S. patent application Ser. No. 12/898,480 entitled "Mechanism for Customized Monitoring of System Activities", filed Oct. 5, 2010, and U.S. patent application Ser. No. 12/898,428 entitled, "Mechanism for Accessing and Processing Monitoring Data Resulting from Customized Monitoring of System Activities", filed Oct. 5, 2010, which are assigned to the assignee of the present application.

TECHNICAL FIELD

The embodiments of the invention relate generally to system monitoring and, more specifically, relate to installing monitoring utilities for performing customized monitoring of system activities.

BACKGROUND

Monitoring tools are commonly available for monitoring system resources. However, a monitoring tool is limited to monitoring a specific resource (e.g., memory capacity) of a computer system. With each monitoring tool being predetermined and specific to a particular system resource and its activities, the process of system monitoring can be highly complicated, and even unmanageable, when activities relating to a great number of system resources require monitoring. For example, depending on a system, a user (e.g., system administrator or software developer) may have to use three different monitoring tools to monitor three different component-related activities (e.g., virtual machine speed, central processing unit (CPU) usage, and memory capacity). Furthermore, these monitoring tools are inflexible in their monitoring tasks because their behavior, performance, assigned system component, etc., are rigidly predefined and unchangeable. Moreover, a system administrator typically has to individually install each desired monitoring tool on each system to be monitored.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 3 illustrates monitoring system activities using a performance monitor according to one embodiment of the invention;

FIGS. 8A, 8B and 8C illustrate a method for executing a monitoring template using a performance monitor according to one embodiment of the invention;

DETAILED DESCRIPTION

Embodiments of the invention provide for automatically installing monitoring tools using a performance monitor. In one embodiment, a universal performance monitor includes an abstraction layer for managing multiple disparate monitoring tools on one or more computing devices. During runtime of the universal performance monitor on a first computing device, the universal performance monitor establishes a secure channel between the first computing device and a second computing device. The universal performance monitor queries the second computing device via the secure channel to determine whether the second computing device includes a specified monitoring tool. Upon determining that the second computing device does not include the specified monitoring tool, the universal performance monitor causes the second computing device to obtain (e.g., download or copy) the specified monitoring tool from a designated location, to install the specified monitoring tool with a particular configuration, to execute the specified monitoring tool and to redirect an output of the specified monitoring tool to the first computing device via the first secure channel. In one embodiment, the universal performance monitor copies an executable file such as a script to the second computing device via the secure channel, and instructs the second computing device to execute the executable file. The executable file may then cause the second computing device to download or copy the specified monitoring tool from the designated location, to install the specified monitoring tool with the particular configuration, to execute the specified monitoring tool and to redirect the output of the specified monitoring tool to the first computing device via the first secure channel.

Figure 1:
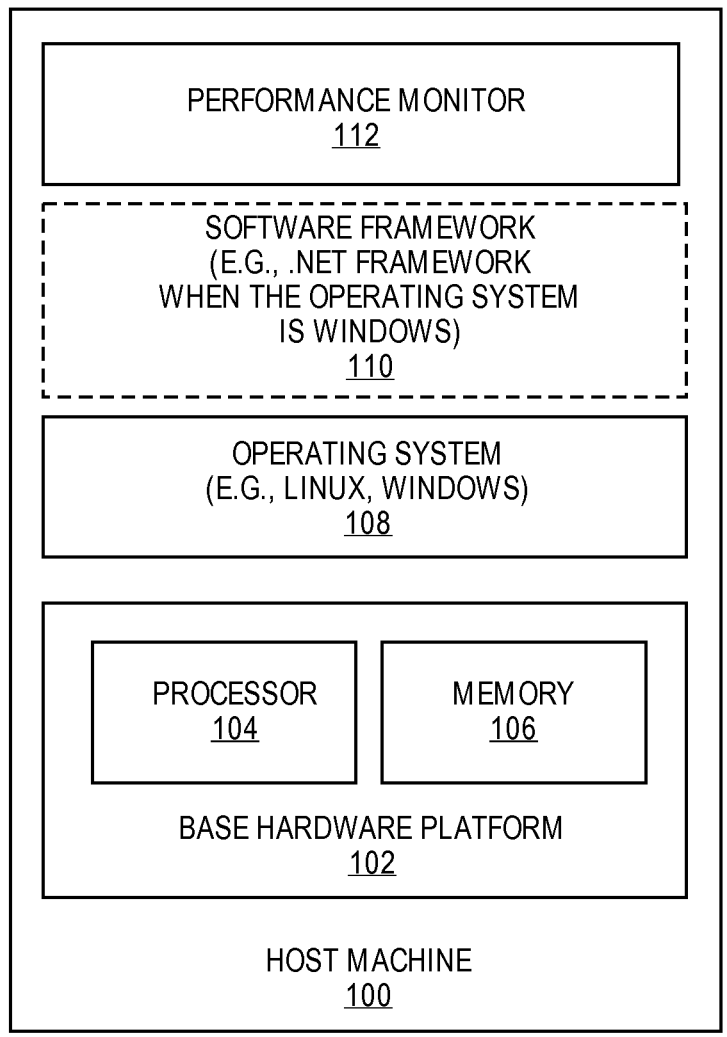
FIG. 1 is a block diagram of a host machine for employing a performance monitor for monitoring system activities according to one embodiment of the invention.

FIG. 1 is a block diagram of a host machine 100 that employs a performance monitor 112 for monitoring system activities according to one embodiment of the invention. Host machine 100 includes a base hardware platform 102 that comprises a computing platform, which may be capable, for example, of working with a standard operating system 108. Operating system 108 serves as an interface between any hardware or physical resources of the host machine 100 and a user. In some embodiments, base hardware platform 102 may include a processor 104, memory devices 106, network devices, and so on. Throughout this document, for brevity and simplicity, Microsoft® Windows® and Linux® are used as examples of an operating system 108 that is capable of employing, supporting, and using a performance monitor 112. However, it is contemplated that performance monitor 112 is compatible with other operating systems. As illustrated here with reference to Windows and Linux, performance monitor 112 is compatible with components that are particular to an operating system 108. For example, Microsoft's .NET® Framework may be employed as a software framework 110 when the operating system 108 is Microsoft Windows, but may not be used when the operating system 108 is Linux. The terms "computer system," "computing device" and "machine" are used interchangeably throughout this document.

Performance monitor 112 is a customizable monitoring tool that a user (e.g., system administrator or software developer) can customize and use to monitor various system activities. Performance monitor 112 represents a universal performance monitoring tool to provide a unique ability to monitor any type and/or number of system entities, resources and/or activities (e.g., physical machine activities, virtual machine activities, etc.). Further, collected data associated with the monitored system entities, system resources, system activities, etc. are directed to any location (e.g., a location of performance monitor 112, a network storage location, a location of another server, etc.) as specified in a configuration template, which may be different from a location specified in another configuration template. Alternatively, a single location may be specified within the configuration of performance monitor 112 (as opposed to in each configuration template).

In one embodiment, performance monitor 112 provides monitoring templates that are capable of being customized to enable the performance monitor 112 to perform system monitoring tasks and other relevant functions in a manner defined in each monitoring template. This customization of the performance monitor 112 includes the ability to consolidate any number of monitoring tools into a monitoring template so that the performance monitor 112 can serve as a single universal monitor. The monitoring templates provide a generic abstract layer over the monitoring tools. Therefore, the performance monitor 112 does not have any dependence on any specific monitoring tools, and can invoke all monitoring tools and interact with those monitoring tool's APIs using a common interface. The monitoring templates may aggregate the data from multiple monitoring tools included in the templates, and provide the aggregated data in a single presentation format.

For example, instead of using three monitoring tools to monitor three different entities (e.g., virtual machine, memory, processor, etc.), a performance monitor template can be created and executed to have the performance monitor 112 act as a universal monitor (using the three monitoring tools) to monitor all three such entities. Although, as in this case, the three existing monitoring tools may still be used (by the performance monitor 112) to perform their respective monitoring tasks, the user has to handle only the performance monitor 112, which is a universal performance monitor. Similarly, performance monitor 112 can be customized to monitor multiple activities (e.g., speed, capacity, etc.) of a single system entity (e.g., processor) or a single (e.g., speed) or multiple activities (e.g., speed, capacity) of multiple system entities (e.g., virtual machine, processor, etc.). Moreover, a monitoring template may be customized to create a new monitoring tool (as opposed to using an existing monitoring tool) that may not even be provided by the operating system 108 to monitor a new system component, a new type of activity of an existing component, an existing component in a new manner, etc. These and other aspects of performance monitor 112 are further discussed with reference to the subsequent figures.

Figure 2:
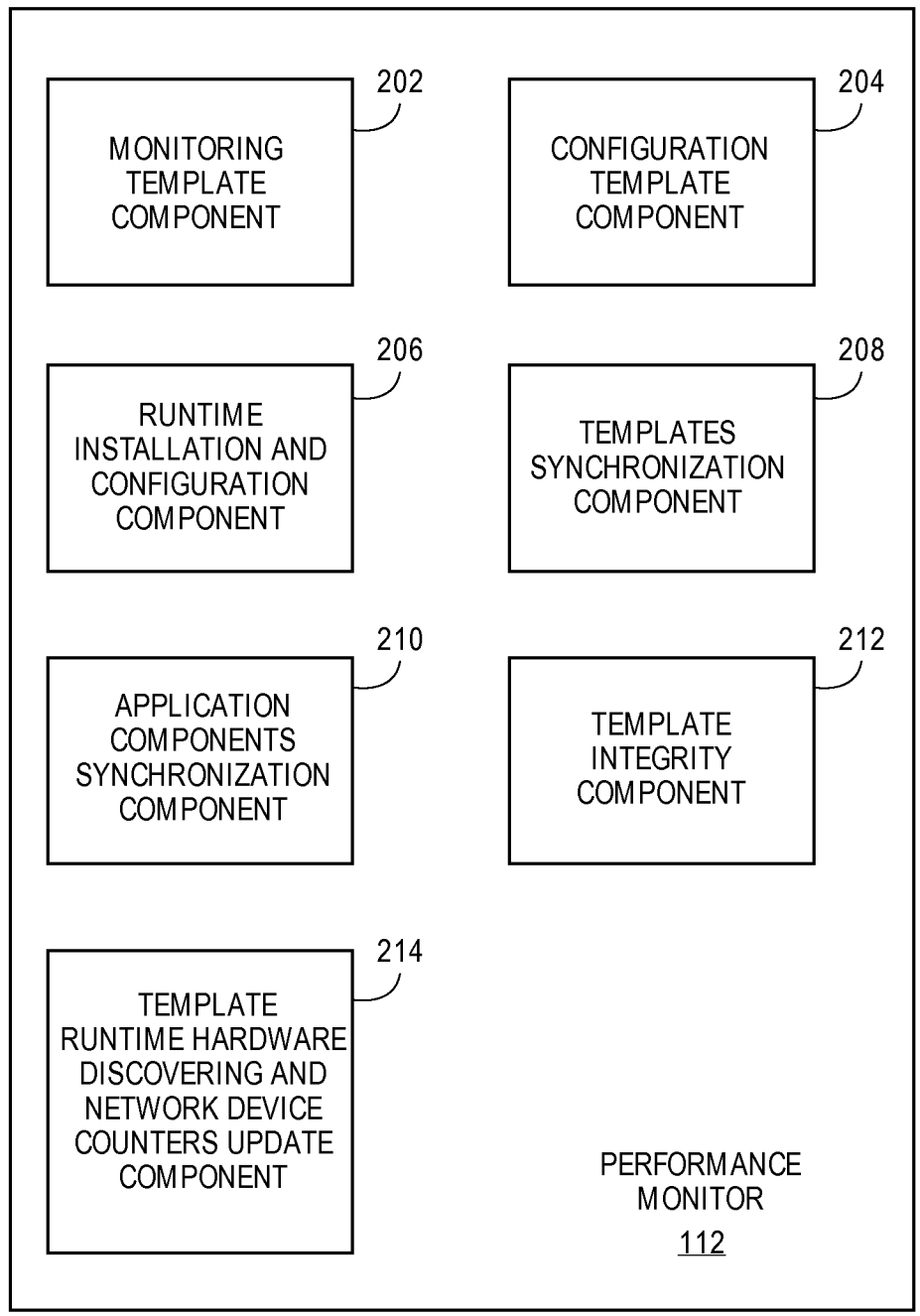
FIG. 2 illustrates a performance monitor according to one embodiment of the invention.

FIG. 2 illustrates a performance monitor 112 according to one embodiment of the invention. In one embodiment, performance monitor 112 includes a number of components 202-214 to perform various functionalities. Monitoring template component 202, as aforementioned, offers the ability to create and run customized monitoring templates to enable the performance monitor 112 to perform monitoring tasks according to the information defined by these customized monitoring templates. For example, a monitoring template may be created for a single use and discarded, or saved and used multiple times immediately and/or subsequently. Further, in one embodiment, using monitoring template component 202, one or more customized monitoring templates are created to consolidate any number of existing monitoring tools in any combination, as desired or necessitated, to enable the performance monitor 112 to serve as a universal monitor to simplify the monitoring process and eliminate the need for the user to access and run a large number of individual monitoring tools. Aside from using the existing monitoring tools, monitoring template component 202 provides an additional ability to create and customize one or more monitoring templates to enable the performance monitor to serve a brand new monitoring tool to perform new or those system monitoring tasks for which a monitoring tool is not available at the machine.

Monitoring template component 202 provides the ability to create, run, use, and store monitoring use-cases (through its monitoring templates). The monitoring use-cases mix and match any existing or new monitoring activities. Any monitoring tool or combination of monitoring tools can be included in a template, regardless of those monitoring tool's application program interfaces (APIs). This is achieved by providing an abstraction layer for the performance monitor 112 that can determine commands, arguments, syntax, etc. associated with each monitoring tool's API, and interact with each monitoring tool using the distinct syntax, arguments, commands and other properties of that monitoring tool's API. Continuing with the Windows and Linux example, monitoring template component 202 enables its monitoring templates to be compatible with, for example, both Linux and Windows operating systems so that their system activities can be seamlessly monitored according to the rules and requirements of each operating system.

When a monitoring tool is run, it may automatically generate secure channels and invoke monitoring tools on remote machines. Further, monitoring templates may be used to specify a system location (e.g., repository, storage device, display device) where the results of monitoring system activities are forwarded. In one embodiment, each monitoring template includes one or more specific locations for monitoring results of one or more specific system activities. In another embodiment, a default location is defined within the configuration of performance monitor 112 itself. Alternatively, monitoring results may be sent to locations specified in monitoring templates and to a default location defined within a configuration of the performance monitor 112.

Configuration template component 204 allows the user to predefine monitoring configuration in each monitoring template for each use-case independently so that each use-case can be executed according to a custom configuration as defined by the user. For example, the user may choose to define a particular configuration (that is compatible with the operating system, such as Linux or Windows) in a monitoring template so that the monitoring template can facilitate the performance monitor 112 to perform its monitoring tasks according to the defined configuration as opposed to a default configuration or a configuration that is the same as another configuration.

Runtime installation and configuration component 206 provides the necessary ability to install and configure remotely any monitoring template so that the performance monitor 112 is able to perform new monitoring tasks of one or more monitoring tool that do not exist. In other words, runtime installation and configuration component 206 helps create and install a new monitoring tool that does not exist on the machine (such as it is not provided by the operating system (e.g., Linux) installed on that machine). Further, the tasks of creating and installing a new monitoring tool may be performed remotely between two or more machines.

In one embodiment, runtime installation is performed by generating a script or other executable file for downloading, installing, configuring and/or executing one or more specified monitoring tools. The type of executable file and contents of the executable file may be dependent on the operating system on which it will be used. For example, a .exe, .bat, .vbs, .aspx, .com, etc. executable file may be generated for execution on a Windows machine. Similarly, a .bin, .sh, .elf, etc. executable file may be generated for execution on a Linux machine. The executable file identifies the name of the monitoring tool to download, a location (e.g., of a repository) to download the monitoring tool from, and fully defines the installation process. Fully defining the installation process may include defining configuration parameters, installation location (e.g., including generating directories and/or subdirectories in specified locations on a machine to which the monitoring tool will be installed), data copying, code compiling, and so on. The executable file may also define update parameters, such as a frequency with which to check for updates to the monitoring tool.

Templates synchronization component 208 supports updating and synchronization of any changes made to an existing version of a monitoring template provided by the performance monitor 112. In one embodiment, a storage or repository (e.g., template version repository) and its location (e.g., on a host machine) are defined within the configuration of the performance monitor 112 such that each time a monitoring template is updated (e.g., another monitoring activity is added to it, monitoring time period is reduced, etc.), the updated monitoring template is saved at the defined repository. Thereafter, at the time of its use, the updated monitoring template is synchronized with other machines being used by the user. This way, each time a user triggers the use of a monitoring template on a machine (either a machine where the template was previously used or a new machine onto which the template is installed and used), the defined repository is accessed for template version verification and updating. Therefore, the most recent version of the monitoring template may be automatically loaded and used. If an updated version of a template includes a new monitoring tool, runtime installation and configuration component 206 may be invoked when the updated version of the template is executed to install the new monitoring tool on a remote host.

Application components synchronization component 210 provides updating and synchronization of any configuration changes, version updates, etc., made to the performance monitor 112 itself. A storage or repository (e.g., performance monitor version repository) and its location (e.g., on a host machine) are defined within the configuration of the performance monitor 112. Any updates made to the performance monitor 112 are communicated to each machine that loads or uses the performance monitor 112. It is to be noted that in this case, the update and synchronization refers to the any updates (e.g., adding a new component) made to the performance monitor 112 itself as opposed to its monitoring templates or monitoring tools included in the monitoring template. In other words, machine A and machine B use the same version of performance monitor 112 but each may use an entirely different set of monitoring templates (such as according to their separate monitoring needs). In case of an update to the performance monitor 112, that update is communicated to both machines A and B so each machine can have the most recent version of the performance monitor 112.

Template integrity component 212 relates to integrity and security of monitoring templates. As a monitoring template is created, a hash code for that monitoring template is calculated and saved. When the same monitoring template is loaded to be used, a hash code of the monitoring template is recalculated and compared to the hash code previously calculated and saved. If the two hash codes match, the monitoring template is allowed to be loaded and used. If the two hash codes do not match, the monitoring template is considered corrupt and the user is notified of its corruption.

Template runtime hardware discovering and network device counters update component ("hardware discovery component") 214 automatically detects new hardware setting and enables performance monitor 112 to adjust according to the new or available hardware setting. For example, a monitoring template may have embedded in it hardware information regarding a network interface of a first device, but if it is executed on a second device having a different network interface, hardware discovery component 214 automatically and in runtime searches and investigates the network interface of the second device and, accordingly, adjusts the performance monitor 112 making it compatible with the change. For instance, in case of a Windows-based system, at the time of creating a monitoring template, the installed hardware devices of a first machine where the monitoring template is created (and executed) are known and defined in the monitoring template, but when this monitoring template is installed on a second machine, the new devices of this second machine are not likely to be defined in the monitoring template. In this case, performance monitor 112 may use its hardware discovery component 214 to automatically and in runtime discover the devices of the second system and update the information in the monitoring template without any interruption. In case of network-related devices, hardware discovery component 214 investigates the new devices and updates counter at runtime without interrupting the monitoring use case associated with the monitoring template.

FIG. 3 illustrates monitoring system activities using a performance monitor 112, according to one embodiment of the invention. In one embodiment, performance monitor 112 uses a number of monitoring templates 302-306 to serve as a universal monitoring tool or a virtual monitoring tool to consolidate various monitoring tools 324-326, 330-332, 336. In the illustrated embodiment, three monitoring templates, processor template A 302, virtual machine template B 304, and virtual machine template B 306, are created and executed using the performance monitor 112. In an example, processor capacity 310 and cycles per second 312 are two different processor activities that are monitored by two separate, but existing, monitoring tools 324, 326. In this case, the user, using processor template A 302, combines the two separate monitoring tools 324, 326 into a single combined monitoring tool, such as processor tool A 322, to perform monitoring of processor capacity 310 and processor cycles per second 312, relating to processor 308, by facilitating processor capacity tool 324 and processor cycles per second tool 326.

Similarly, using virtual machine template A 304, two monitoring tools, virtual machine capacity tool 330 and virtual machine speed tool 322, are combined as virtual machine tool A 328 to serve as a combined tool to monitor system activities of virtual machine capacity 316 and virtual machine speed 318 of virtual machine 314. In another example, suppose the user wishes to continue to monitor virtual machine capacity 316 of virtual machine 314, but this time it is to be done while monitoring the virtual machine's 314 relationship to other virtual machine(s) 320. To perform these monitoring tasks, the user creates and executes, via performance monitor 112, another monitoring template, such as virtual machine template B 306, to combine virtual machine capacity tool 330 with relationship to other virtual machine(s) tool 336 to monitor virtual machine capacity 316 and the virtual machine's 314 relationship to other virtual machine(s) 320, respectively.

In other words, in one embodiment, using (e.g., creating and executing) various monitoring templates 302-306, the monitoring capabilities of various monitoring tools 324-326, 330-332, 336 is absorbed by consolidating these monitoring tools 324-326, 330-332, 336 in various combinations. For example, as illustrated, a monitoring template 302 is generated to contain the capability of one or more monitoring tools 324, 326 by consolidating these monitoring tools 324, 326 into a single virtual monitoring tool 322 to perform the monitoring tasks 310, 312 of these monitoring tools 324, 326, respectively, using performance monitor 112. These monitoring templates 302-306 are then executed to have performance monitor 112 serve as a universal monitoring tool or virtual monitoring tool, through consolidated monitoring tools 322, 328, 334, to facilitate the various monitoring tools 324-326, 330-332, 336 to perform their corresponding monitoring tasks 310-312, 316-318, 320.

Figure 4A:
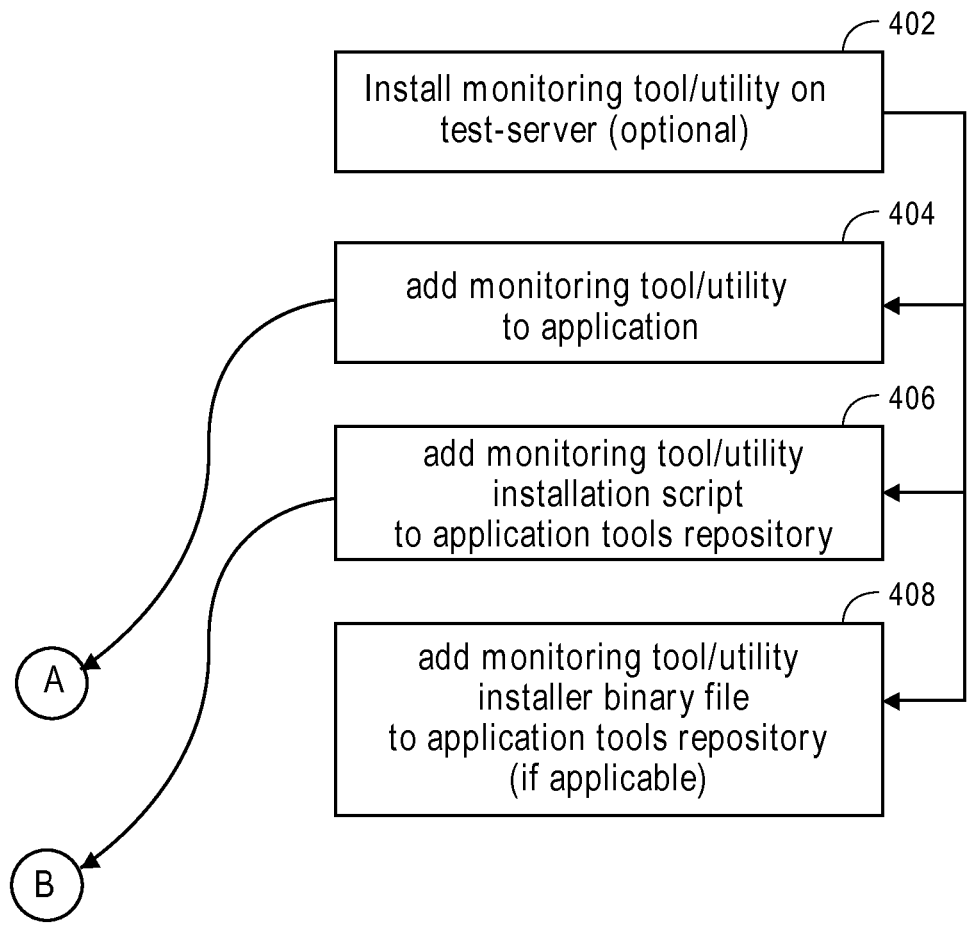
FIGS. 4A and 4B illustrate a transaction sequence for adding a performance monitor to a Linux operating system-based machine according to one embodiment of the invention.
Figure 4B:
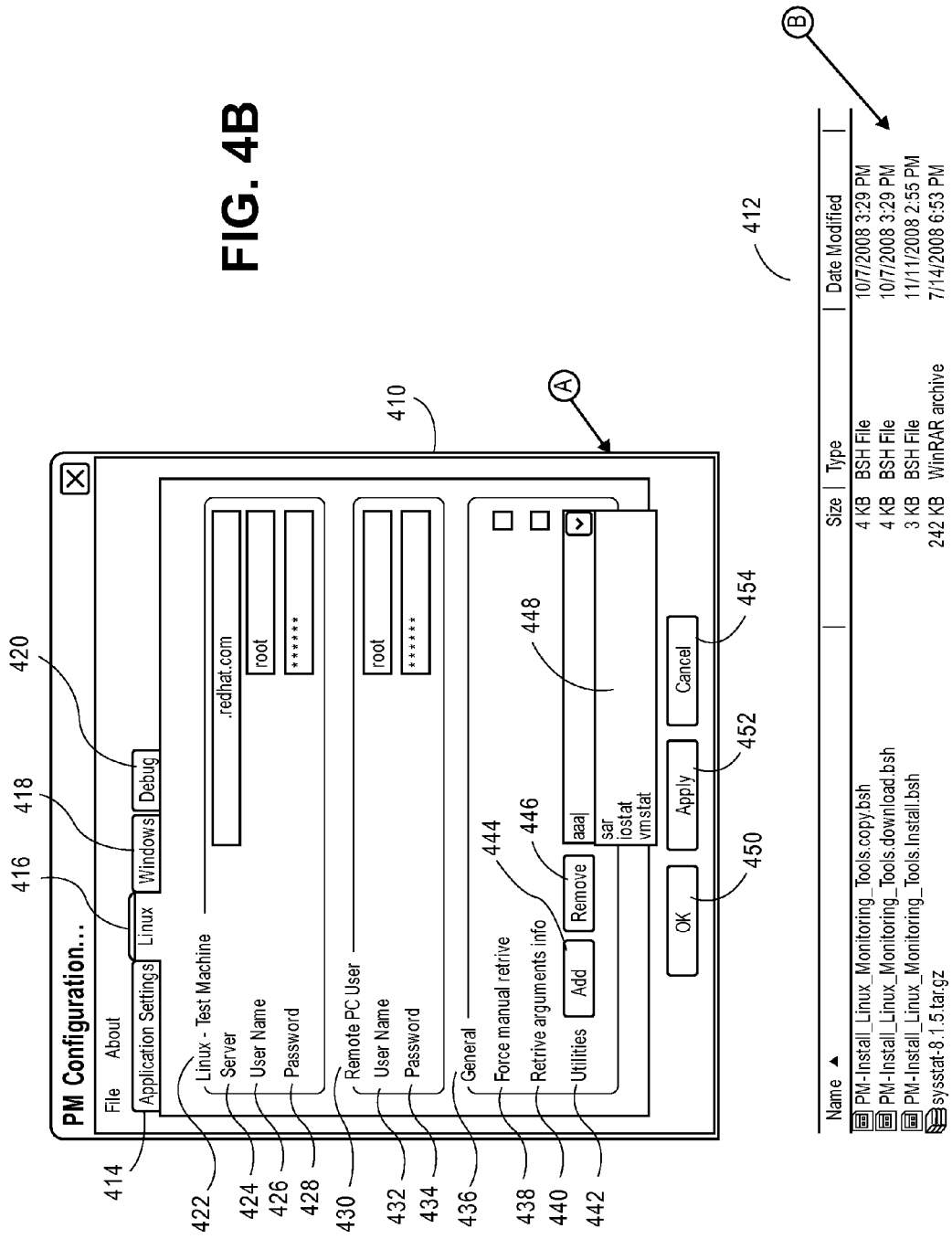

FIGS. 4A and 4B illustrate a transaction sequence for adding a monitoring tool/utility to a machine according to one embodiment of the invention. In FIG. 4A, a monitoring tool/utility is installed on a test server or machine at block 402. In one embodiment, the test server/machine is a Linux operating system-based machine. Alternatively, the test server/machine may be a Windows operating system-based machine (e.g., that includes the .NET framework). This test server installation is performed to access and/or have a cache of "help" pages (e.g., Linux "man" pages) to copy or save them locally to be used later when arguments may be needed to create monitoring templates.

In one embodiment, the performance monitor walks through the help (e.g., man) pages for the monitoring tool. The help pages typically have a particular format/layout, in which they identify arguments that can be used with the associated monitoring tool that the help pages describe. The help pages may include separate sections that define general commands, system calls, library functions (e.g., C library functions), file formats and conventions, system administration commands and daemons, and so on. The performance monitor may include information describing the structure/layout of each of the sections, and based on this information may identify permissible execution variables, arguments, etc. for the monitoring tool. The identified permissible execution variables, arguments, etc. for the monitoring tool may then be saved for later use during template generation. Once the arguments that can be used with a monitoring tool are identified, performance monitor can present these arguments to a user during template creation. For example, a user can choose the monitoring utility for a template, and can then choose any of the associated arguments from a drop down menu.

At block 404, the monitoring tool/utility (see GUI display of PM configuration 410 of FIG. 4B) is added to the machine (e.g., in a Linux environment), showing retrieving arguments information 440 in the bottom general section 436 of PM configuration 410. A monitoring tool/utility installation script or other executable file (see script 412 of FIG. 4B) is added to a designated application tools repository. At block 408, if necessary or applicable, a monitoring tool/utility installer binary file or other executable file is added to the application tools repository.

The illustrated GUI interface of PM configuration 410 of FIG. 4B includes an application settings tab 414, a Linux tab 416, a Windows tab 418, and a debug tab 420. In the illustrated embodiment, the Linux tab 416 of PM configuration 410 provides a Linux test machine section 422, a remote pc user section 430, and a general section 436. The Linux test machine section 422 provides a server space 424 to enter a server name on which performance monitor is to be installed and used, a user name space 426 and a password space 428 for the user name and password, respectively, of the user having access to the server and performance monitor. Similarly, remote PC user section 430 provides spaces for user name 432 and password 434 for a user accessing the server and performance monitor remotely. General section 436 provides a force manual retrieve 438 to retrieve a manual or help pages, a retrieve arguments info section 438 to retrieve the arguments and relevant information as described with reference to FIG. 4A, and a utilities section 442 provides an option to select a monitoring utility from a dropdown menu of a list of monitoring utilities 448 and either add 444 or remove 446 the selected monitoring utility 448. A monitoring utility 448 here refers to a utility for monitoring a system utility, activity or component that is to be monitored by performance monitor or stopped from being monitored by it. At the bottom of the GUI display of PM configuration 410, three buttons 450, 452, 454 are provided to okay 444 the transaction, apply it 446 or cancel it.

Figure 5A:
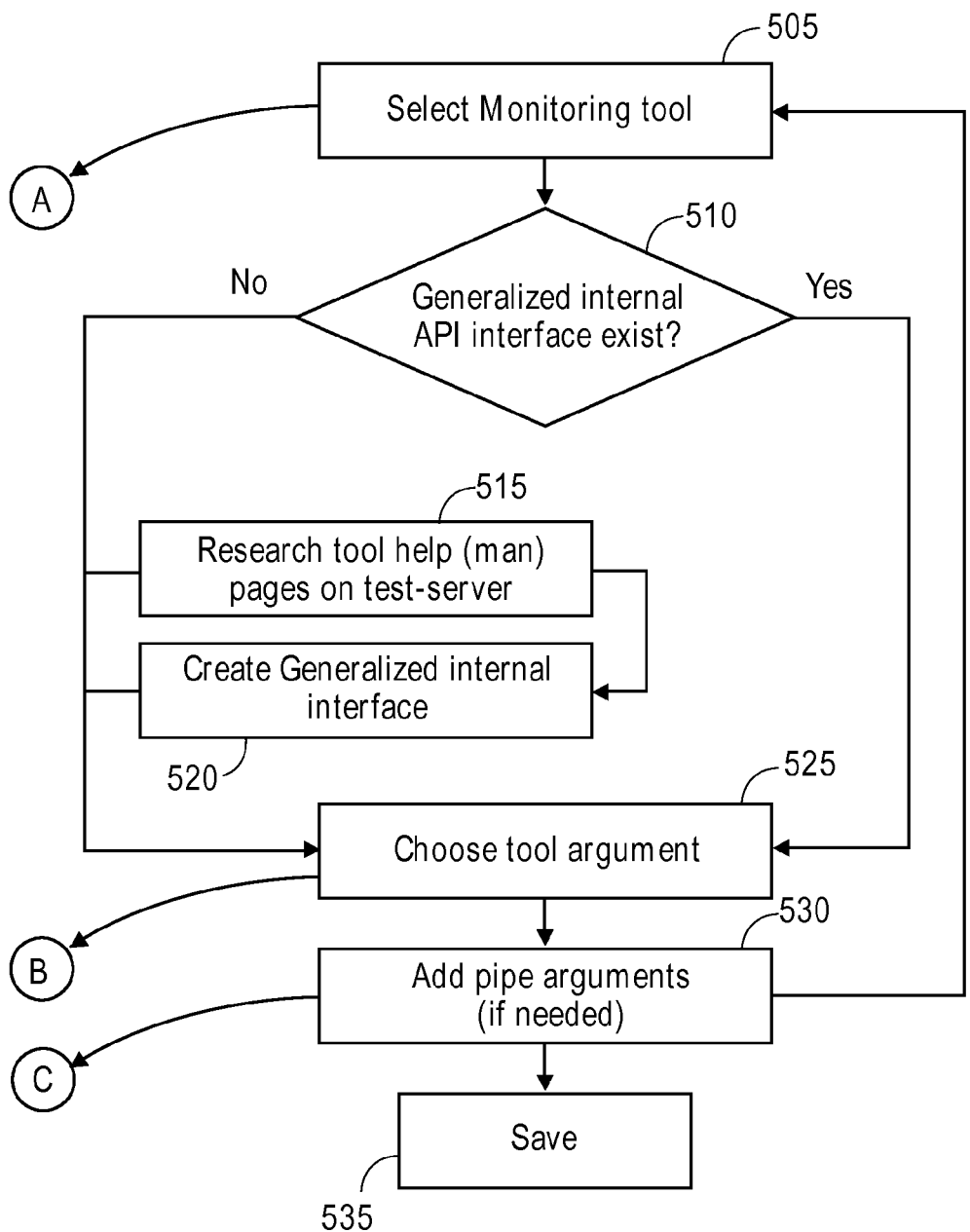
FIGS. 5A and 5B illustrate a transaction sequence for creating a monitoring template using a performance monitor on a Linux operating system-based machine according to one embodiment of the invention.
Figure 5B:
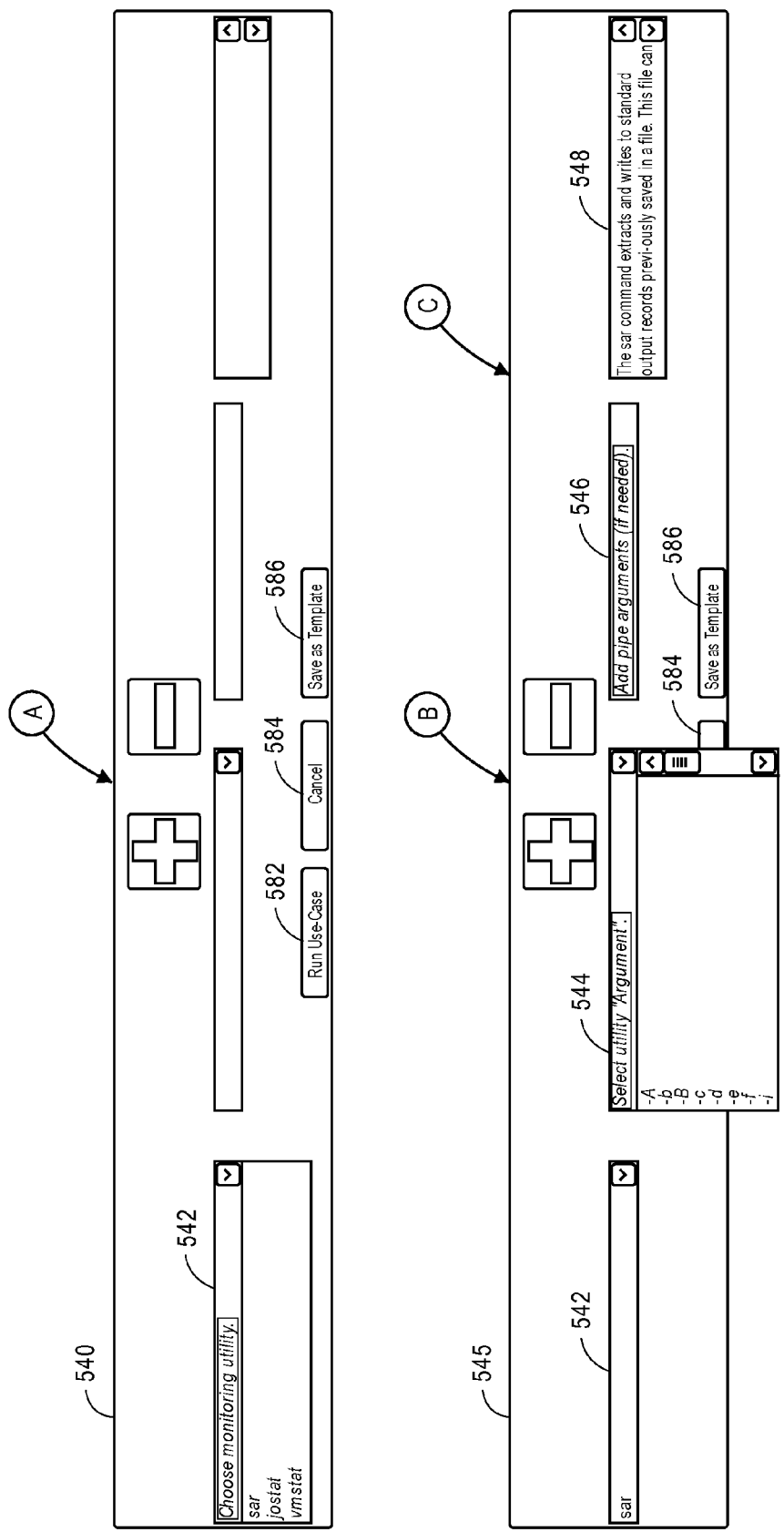

FIGS. 5A and 5B illustrate a transaction sequence for creating a monitoring template using a performance monitor on a machine according to one embodiment of the invention. The transaction sequence shown in FIGS. 5A and 5B may be for creating a template for use on a Linux operating system-based machine. In FIG. 5A, at block 505, a performance monitor is selected to create a monitoring template to use a monitoring tool (see GUI-based display 540 of FIG. 5B). At block 510, a determination is made regarding whether a generalized internal interface exists. If not, the help pages (e.g., man pages) from the test server (that was used to hold a local copy of these help pages in FIG. 4A) are accessed at block 515. These help pages include arguments that can be extracted and used to create generalized internal interface at block 520. Alternatively, a list of arguments generated from the help pages may be accessed. At block 525, once a generalized interface is created (or if one exists already), an argument is then chosen (see the B arrow in GUI-based display 545 of FIG. 5B) from the available arguments/variables for the monitoring template. At block 530, a pipe argument (if needed) is then chosen (see the C arrow of GUI-based display 545 of FIG. 5B) to serve as a functionality to be added to the monitoring template at block 530. At block 535, these arguments are saved. Further, an option of saving the monitoring template (to be run later), running the use-case (running one or more times), or cancelling the transaction is chosen.

The illustrated embodiment of the GUI-based display 540 provides the user with an option to select a monitoring utility 542 that is to be used to monitor a system entity, resource, activity, etc. using the monitoring template 540. The monitoring utility 542 may be selected from a dropdown menu having a list of monitoring utilities. The GUI-based illustration 545 provides the selected utility 542 of "sar". Similarly, another dropdown menu is provided to select an argument 544 for the "sar" utility. Further, a pipe argument (if needed) 546 can be selected, and relevant information 548 can be added. The pipe argument enables data that is output from the monitoring tool to be operated on in a specific way. For example, the output of one monitoring tool can be used as the input to another monitoring tool via the pipe command. This relevant information 548 relates to the selected utility 542, argument 544, and any pipe argument 546. Moreover, three buttons are provided to run a template use case 582, save the template 586 for immediate or later use, or cancel 584 the transaction (such as canceling the transaction of creating a monitoring template).

Figure 5C:
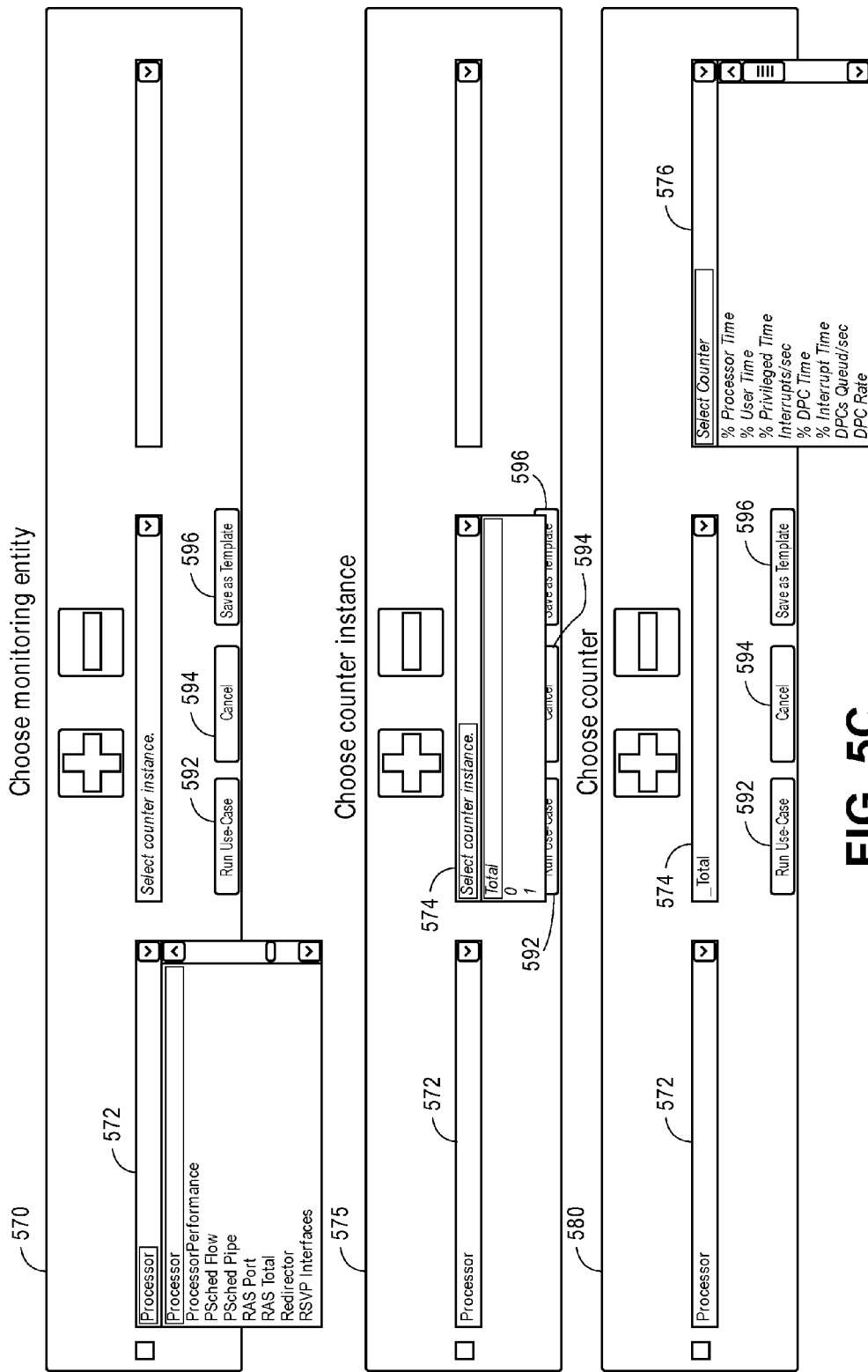
FIG. 5C illustrates a transaction sequence for creating a monitoring template using a performance monitor on a Windows operating system-based machine according to one embodiment of the invention.

FIG. 5C illustrates a transaction sequence for creating a monitoring template using a performance monitor according to another embodiment of the invention. The transaction sequence shown in FIG. 5C may be for creating a monitoring template for use on a Window operating system-based machine. In a GUI-based display 570, an option to select a monitoring entity 572 (similar to a monitoring utility of FIGS. 4A-4B and 5A-5B), such as processor, memory, virtual machine, etc., whose activities are to be monitored is displayed. Similarly, a monitoring entity may be selected if its monitoring is to be stopped. In GUI-based display 575, a .NET framework-based counter instance 574 is chosen. Once the counter instance 574 is chosen, a counter (e.g., processor time, user time, etc.) 576 is chosen as illustrated in GUI-based display 580. GUI-based display 580 also indicates the selected utility 572 and counter instance 574 of "processor" and "Total". A counter refers to an activity that is to be monitored. Then, an option of saving 596 the monitoring template (to be run later), running a use-case 592 (running one or more times), or cancelling 594 the transaction is chosen.

Figure 5D:
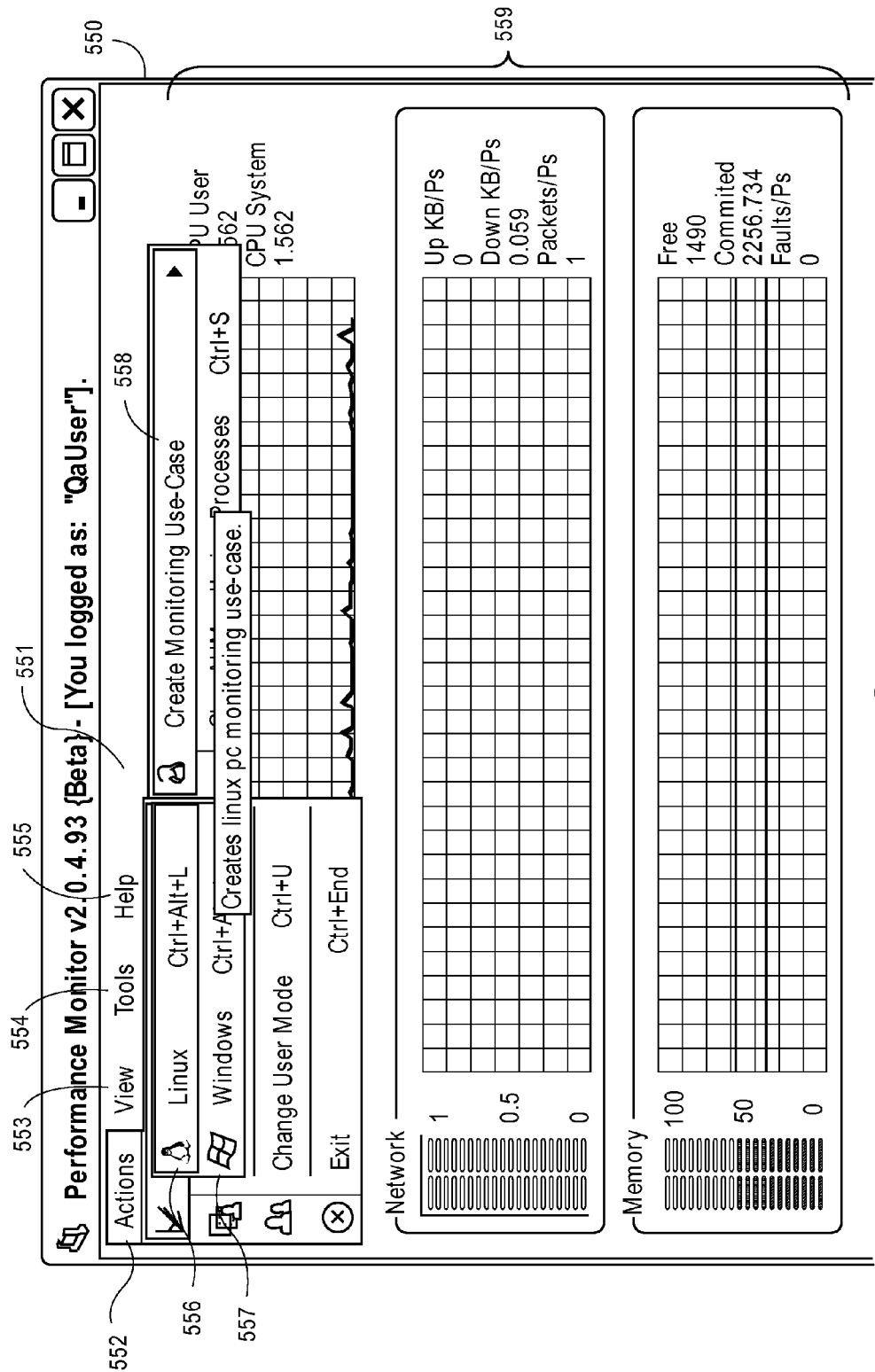
FIG. 5D illustrates a graphical user interface (GUI)-based display of performance monitor is provided.

FIG. 5D illustrates a GUI-based display 550 of performance monitor. The GUI-based display 550 is provided for, for example, creating a monitoring template for a monitoring use-case with a choice of an operating system (e.g., Linux, Windows, etc.) according to one embodiment of the invention. The illustrated GUI-based display 550 of the performance monitor provides various choices through a menu bar 551, such as actions 552, view 553, tools 554, and help 555. Actions 552, for example, provide for selection of either a Linux operating system 556 (such as by using the dropdown menu or by typing in Ctrl+Alt+L, as shown) or a Windows operating system 557 (such as by using the dropdown menu or by typing in Ctrl+Alt+W, as shown). For example, as illustrated, if the Linux operating system 556 is selected, the user is provided additional options, such as creating monitoring use-case 558, as shown, or the user my select other options. In the background and by selecting view 553 from the menu bar 551, the user can view the ongoing performance 559 of the activities of various system components, such as CPU, network, and memory. Other options, such as tools 554 and help 555 may be selected to have access to other monitoring tools and help menu, respectively.

Figure 6:
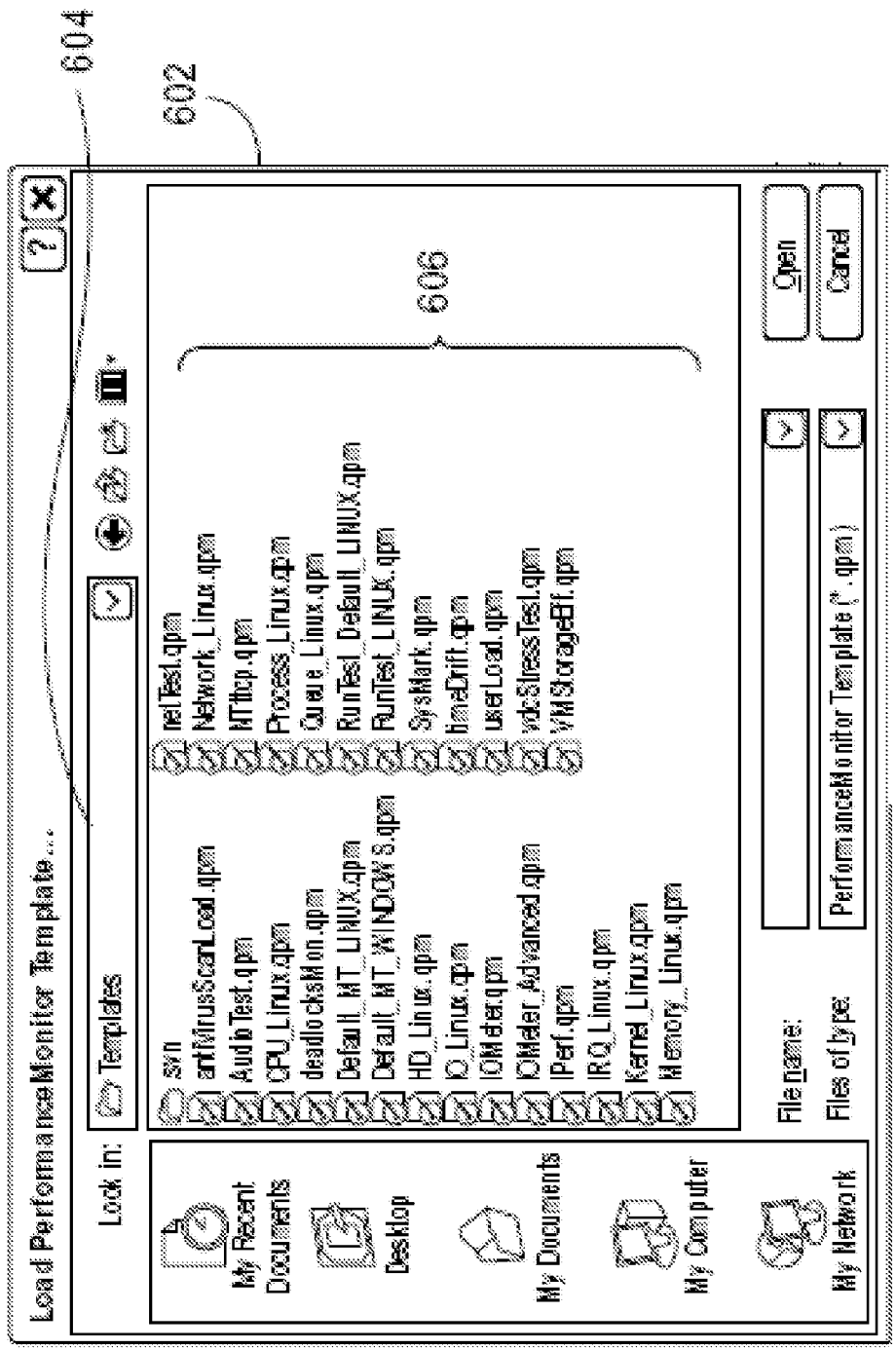
FIG. 6 illustrates a GUI-based display showing various saved monitoring templates.

FIG. 6 illustrates a GUI-based display 602 showing various saved monitoring templates according to one embodiment of the invention. GUI-based display 602 shows one or more of these saved monitoring templates 606 that may be selected, using a dropdown menu 604, to be loaded by the user. Monitoring results are logged by the performance monitor for future processing. After the future processing, the monitoring results may or may not be displayed graphically (e.g., via a GUI-based display).

Figure 7A:
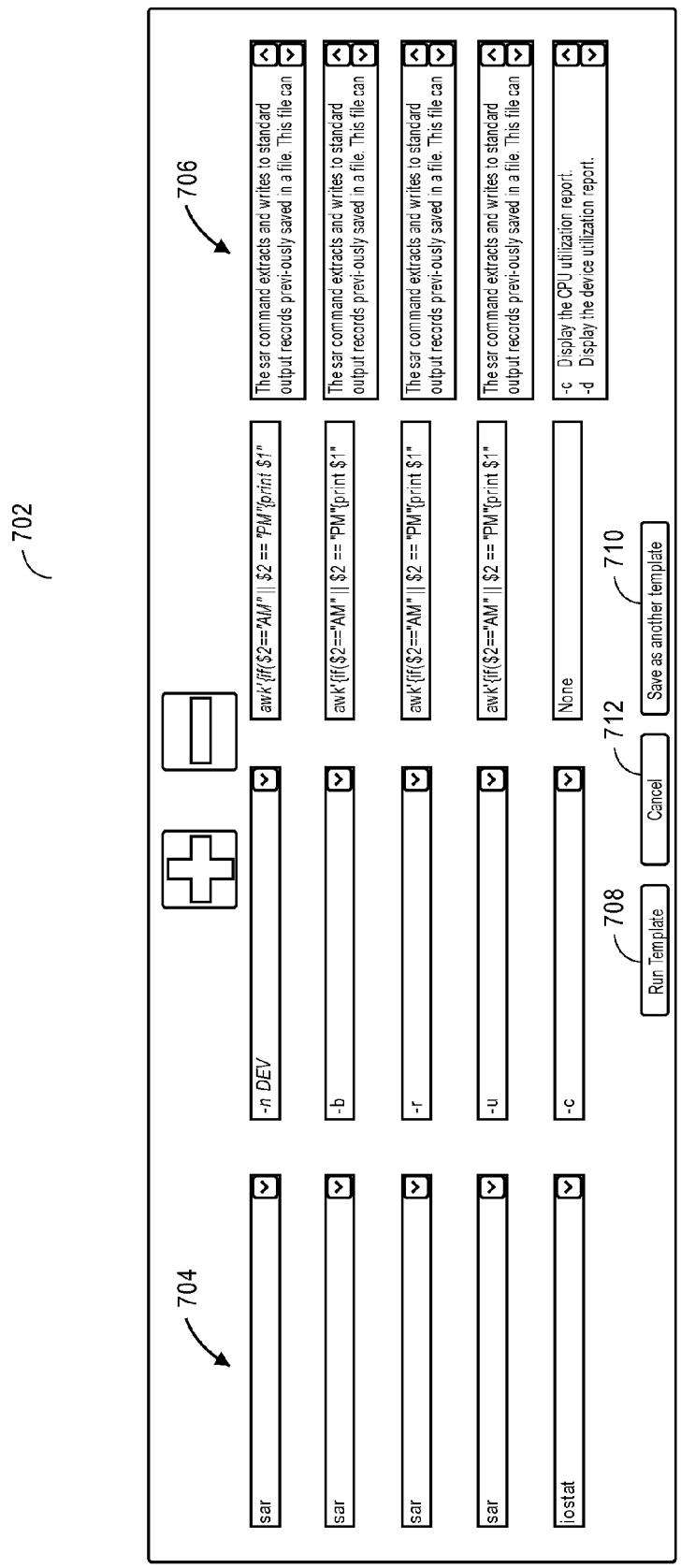
FIGS. 7A and 7B illustrate a Linux monitoring template and a Windows monitoring template according to one embodiment of the invention.

FIG. 7A illustrates an exemplary Linux monitoring template 702 according to one embodiment of the invention. Linux monitoring template 702 illustrates a utility column 704 showing the entities that are to be monitored as well as a list of arguments and pipe arguments 706 that are extracted from help pages to create the monitoring template 702. Further, a user may choose to run the monitoring template 708, cancel the monitoring template or transaction 712, or save as another monitoring template 710.

Figure 7B:
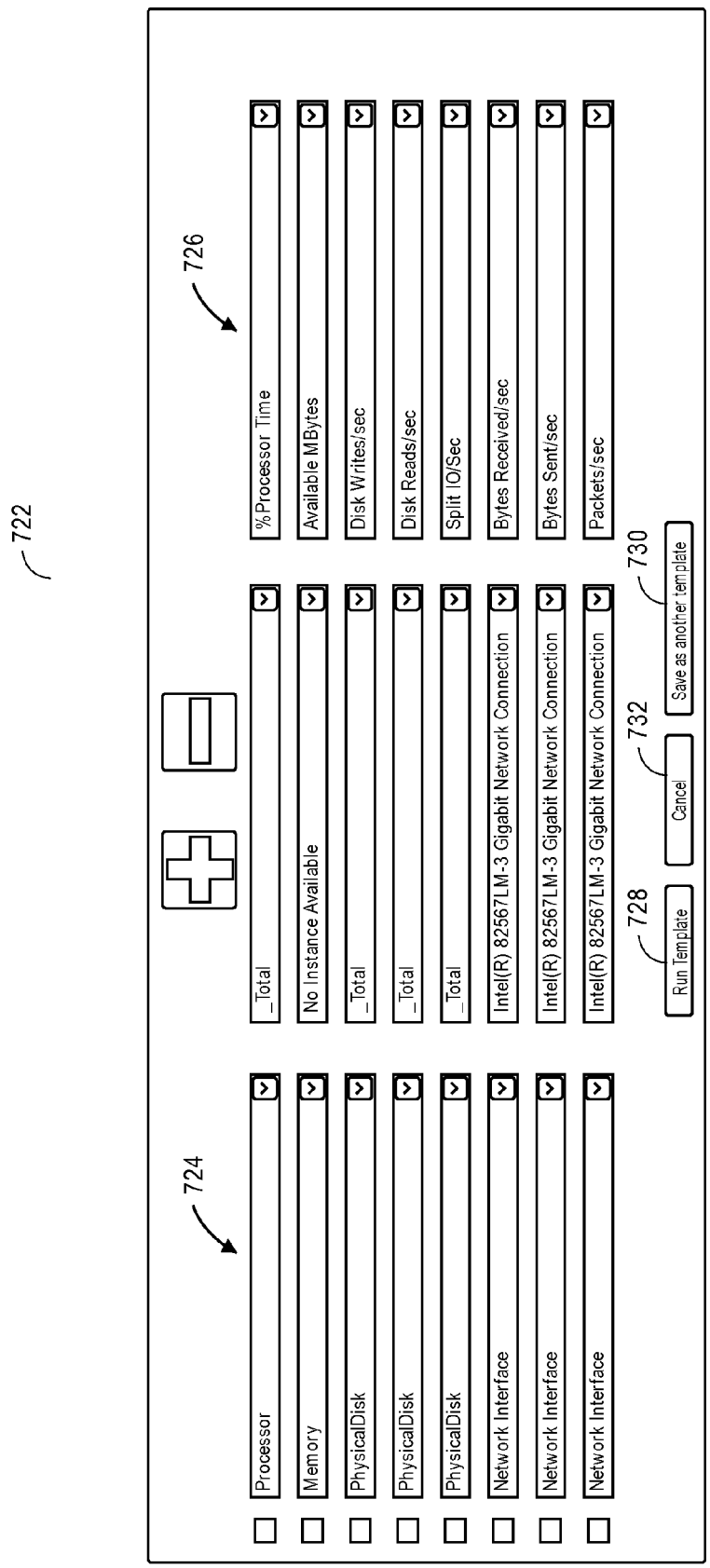

FIG. 7B illustrates a Windows monitoring template 722 according to one embodiment of the invention. Windows monitoring template 722 has a column 724 of system entities or components that are to be monitored, column 726 showing the activities of the components that are to be monitored. The user is given the options of running the monitoring template 728, cancelling the monitoring template or transaction 732, or saving as another monitoring template 730.

Figure 8A:
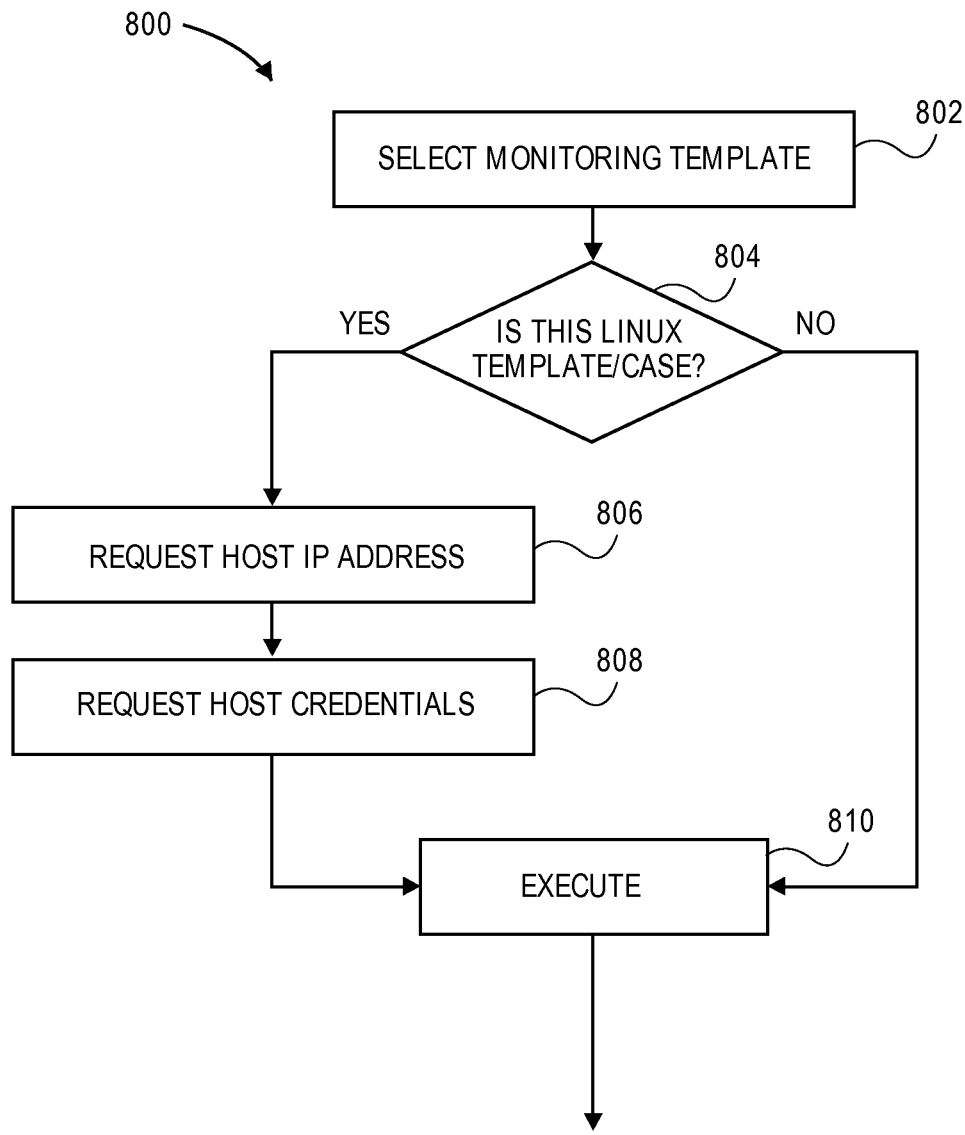
Figure 8B:
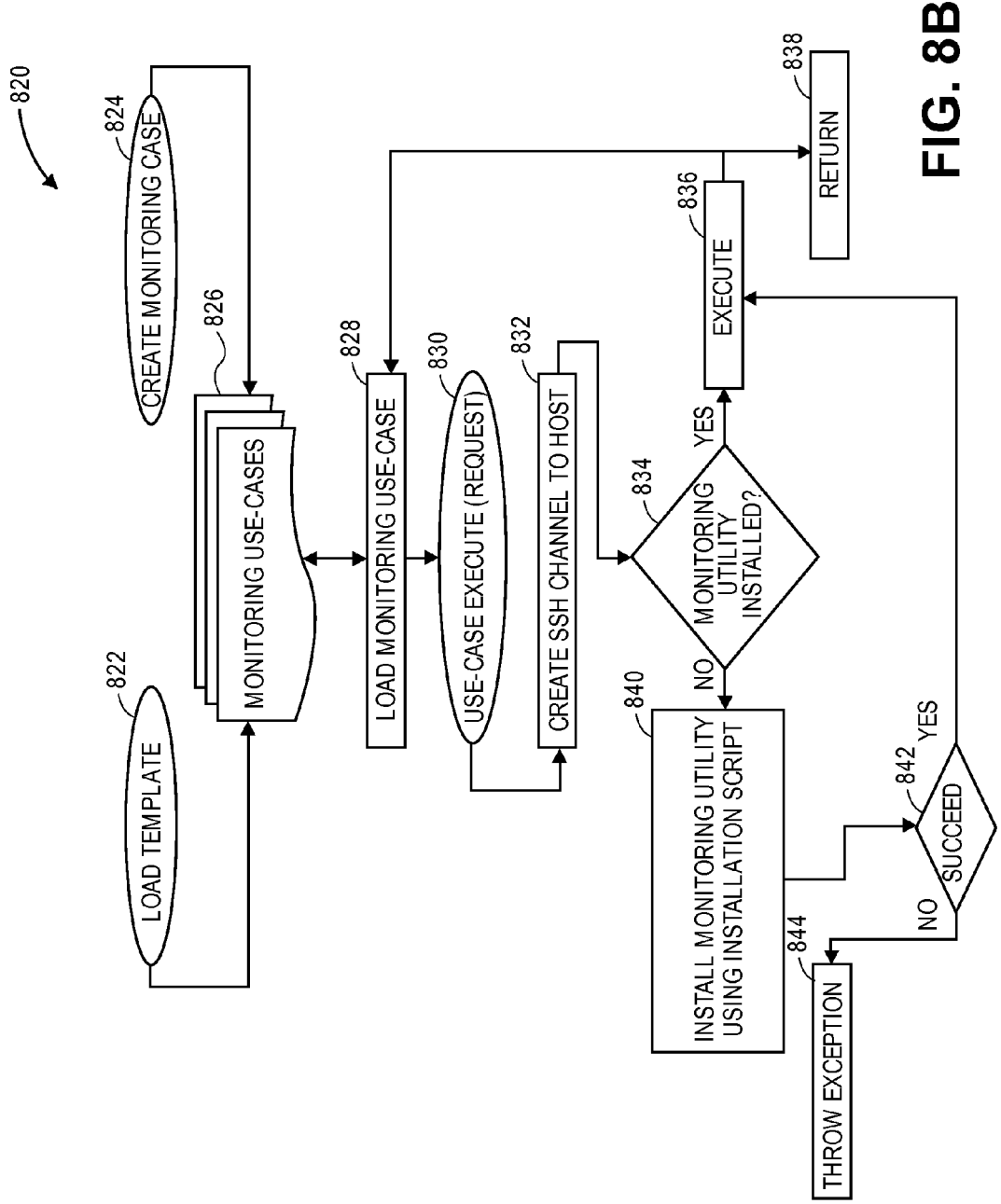

FIGS. 8A, 8B and 8C illustrate methods for executing a monitoring template using a performance monitor according to one embodiment of the invention. Methods 800, 820 and 850 of FIGS. 8A, 8B and 8C, respectively, may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 800 is performed by performance monitor 112 of FIG. 1.

In FIG. 8A, method 800 beings at block 802 with selection of a monitoring template. At block 804, a determination is made as to the type of operating system, such as whether the monitoring template or use-case is Linux-based. If the operating system in not Linux (e.g., it is Windows), the monitoring template is executed at block 810. If the operating system is Linux, a host internet protocol (IP) address is requested at block 806. The host IP address relates to the host machine (e.g., remote host machine) where the monitoring template is to be executed. Further, host machine credentials (e.g., how to connect to the host machine) are requested at block 808. At block 810, the monitoring template is executed.

FIG. 8B illustrates a method for executing a monitoring template using a performance monitor according to one embodiment of the invention. A monitoring template is loaded at block 822 or a monitoring case is created at block 824. Monitoring use-cases are compiled at block 826. A monitoring use-case is loaded at block 828 and its execution is requested at block 830. At block 832, a secure network protocol-based communication (e.g., a secure shell (SSH) channel) is created with the host machine. At block 834, a determination is made as to whether the monitoring utility is installed. If the monitoring utility is installed, the monitoring template is executed and the monitoring utility is monitored at block 836 and, if desired or necessitated, a return to loading another use case at block 828 is triggered at block 838. Loading another use case may include establishing an additional secure channel with the host machine, and invoking the same monitoring tool using different arguments. If the monitoring utility is not installed, at block 840, the monitoring utility is installed (e.g., using an installation script). If the installation is successful at block 842, the monitoring template is executed at block 836; otherwise, an error occurs and an exception is thrown at block 844.

FIG. 8C illustrates a method for executing a Windows-based monitoring template using a performance monitor according to one embodiment of the invention. At blocks 852, 854, a monitoring template is loaded and monitoring templates are compiled, while at blocks 856, 858, a monitoring case is created and monitoring cases are compiled. A monitoring use-case is loaded at block 860 and its execution is requested at block 862. At block 864, the monitoring case is localized (if needed). For example, if a monitoring template's execution is requested for a different machine than the one for which it was created or last run on, the monitoring template needs to be localized for the new machine. This is performed using the hardware discovery component of a performance monitor (see FIG. 2) which detects, in runtime, the network protocol of the new machine and makes the monitoring template compatible with the new machine. The monitoring template is executed at block 866.

Figure 8D:
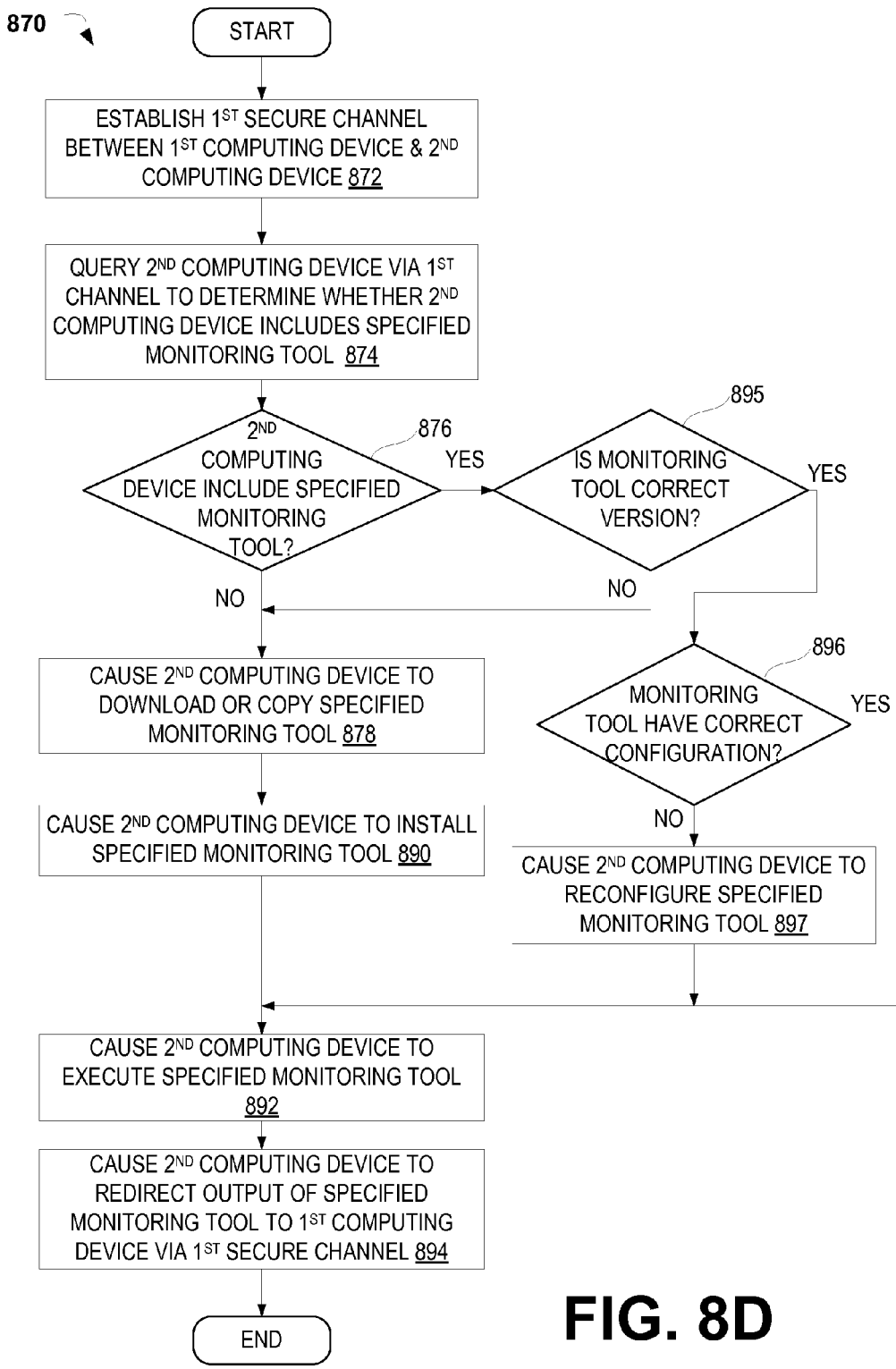
FIG. 8D illustrates one embodiment for a method of automatically installing monitoring tools on a remote computing device.

FIG. 8D illustrates one embodiment for a method 870 of automatically installing monitoring tools on a remote computing device. Method 800 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 870 is performed by performance monitor 112 of FIG. 1.

Referring to FIG. 8D, at block 872 a first computing device establishes a secure channel with a second computing device. In one embodiment, a performance monitor running on the first computing device establishes a secure channel with a remote computing device. The secure channel may be a secure shell (SSH) channel, a secure sockets layer (SSL) channel, transport layer security (TLS) channel, etc. By establishing the secure channel with the remote computing device, the performance monitor opens a console or terminal window with the remote computing device. The output of all monitoring tools that execute in the console/terminal window is redirected to the performance monitor via the secure channel.

At block 874, the first computing device (e.g., the performance monitor running on the first computing device) queries the second computing device to determine whether the second computing device includes a specified monitoring tool. The specified monitoring tool is a monitoring tool included in a monitoring template that has been executed on the first computing device. Examples of Linux monitoring tools include sar, pidstat, iostat, pfmon, bmon, bwbar, ibmonitor, pktstat, etc. Examples of Windows monitoring tools include rmmap, coreinfo, accesschk, portmon, procdump, process monitor, pstools, etc. The first computing device may query the second computing device for the specified monitoring tool by executing a search for the monitoring tool on the second computing device (e.g., using Windows explorer, a command line search, the Linux "find" command, etc.).

At block 876, the first computing device determines whether the second computing device includes the specified monitoring tool. If the second computing device includes the specified monitoring tool, the method continues to block 895. If the second computing device does not include the specified monitoring tool, the method proceeds to block 878.

At block 895, the first computing device determines whether the second computing device includes a particular version of the monitoring tool. In one embodiment, the first computing device determines whether the second computing device includes at least a minimum version of the monitoring tool. Alternatively, the first computing device may determine whether the second computing device includes a most current version of the monitoring tool or the exact specified version of the monitoring tool. If the second computing device does not include the specified version or a newer version of the monitoring tool, the method continues to block 878. Otherwise, the method proceeds to block 896.

At block 896, the first computing device determines whether the monitoring tool included in the second computing device has a specified configuration. If the monitoring tool does not have the specified configuration, the method continues to block 897, and the first computing device causes the second computing device to reconfigure the monitoring tool so that the monitoring tool has the specified configuration. Otherwise, the method proceeds to block 892.

At block 878, the first computing device causes the second computing device to download the specified monitoring tool. The first computing device may identify a location (e.g., of a repository that holds monitoring tools) from which the second computing device is to download the monitoring tool. Once the second computing device has downloaded the monitoring tool, the first computing device causes the second computing device to install the monitoring tool. The second computing device may be made to generate a directory and/or subdirectory within which to install the monitoring tool. The second computing device may also be made to configure the newly installed monitoring tool. The configuration may be performed before, during or after the installation of the monitoring tool.

At block 892, the first computing device causes the second computing device to execute the specified monitoring tool. At block 894, the first computing device causes the second computing device to redirect the output of the specified monitoring tool to the first computing device via the secure channel.

In one embodiment, blocks 878, 890, 892 and/or 894 of method 870 are performed by downloading an executable file such as a monitoring tool installation script onto the second computing device. The performance monitor may execute the executable file on the second computing device via the secure channel. The executable file may then execute instructions that cause it to download the monitoring tool from the specified location, install and configure the monitoring tool, and execute the monitoring tool. The executable file may also include additional instructions for performing the operations of blocks 874, 876, 895, 896 and/or 897. Therefore, in one embodiment, once the secure channel is established, the performance monitor simply downloads the executable file to the second computing device and executes the executable file. In a short amount of time, the performance monitor will then begin receiving an output of the monitoring tool via the secure channel.

Method 870 may be performed simultaneously by the first computing device for multiple monitoring tools to be installed on a single remote computing device. For example, the performance monitor may establish multiple secure channels with a single remote computing device, each of the secure channels being associated with a different terminal window. Via each terminal window, the first computing device may cause the second computing device to download, install and execute a different monitoring tool. This may be performed in parallel.

Method 870 may also be performed simultaneously by the first computing device for one or more monitoring tools to be installed on multiple remote computing devices. For each monitoring tool and each remote computing device, a separate secure channel may be established. Additionally, a single monitoring tool may be installed on a computing device multiple times, with each installation being implemented using a different secure channel and having a different configuration.

FIGS. 9A, 9B, 9C and 9D illustrate GUI-based interfaces or displays 902-908 of various performance monitor configuration options according to one embodiment of the invention. GUI-based display 902 of FIG. 9A reflects a general application settings option 910 for a performance monitor. Under generation application settings 910, a general section 922 and database section 924 are provided for selection of general items (such as template default location, application update repository, etc.) and database-related items (such as the database location, password to access the database, etc.). As with other GUI-displays, this GUI-based display 902 provides options to okay 926 the selections, apply 928 the selections, or cancel 930 the selections.

Figure 9A:
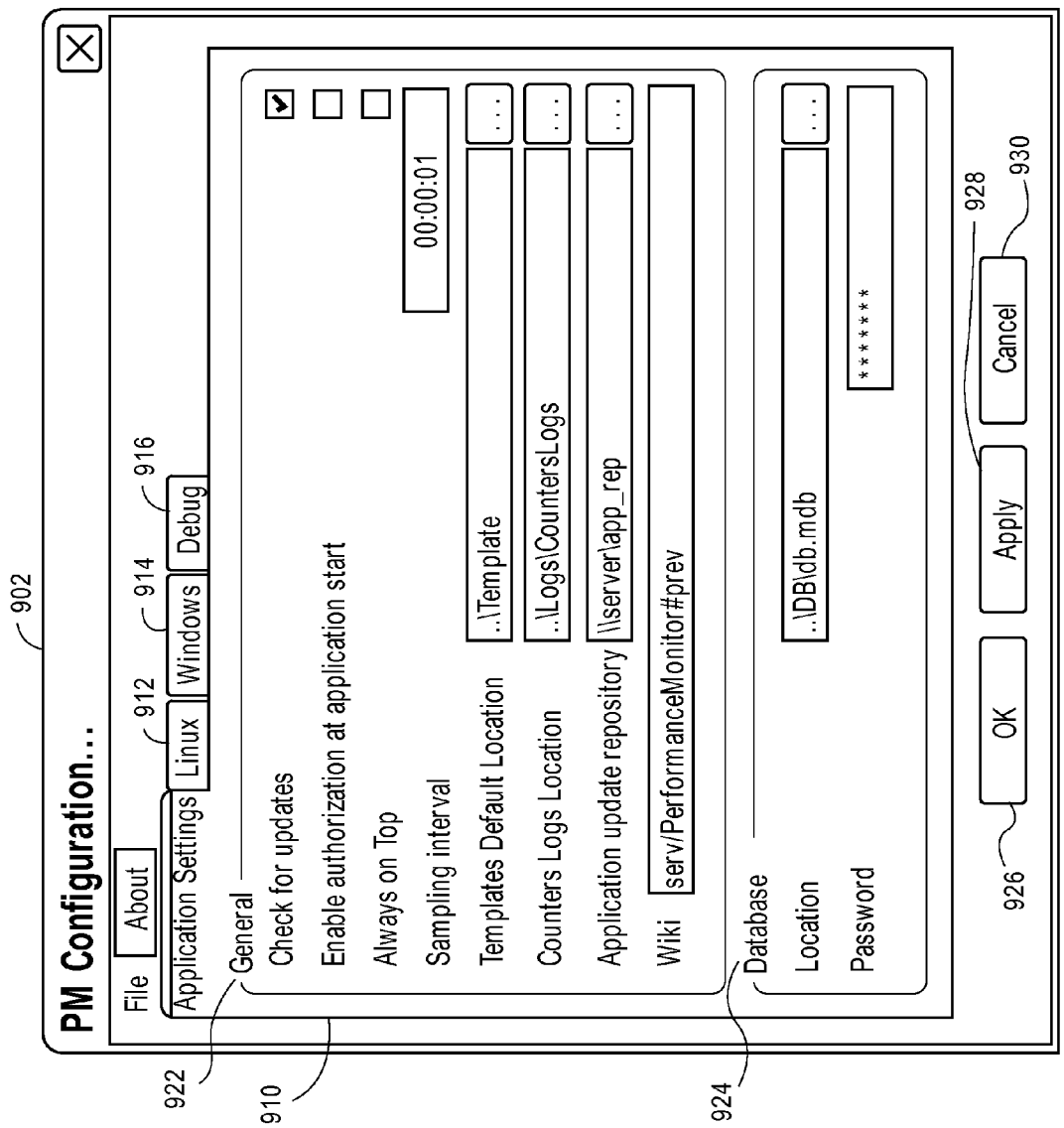
FIGS. 9A, 9B, 9C and 9D illustrate GUI-based interfaces or displays of various performance monitor configuration options according to one embodiment of the invention.
Figure 9B:
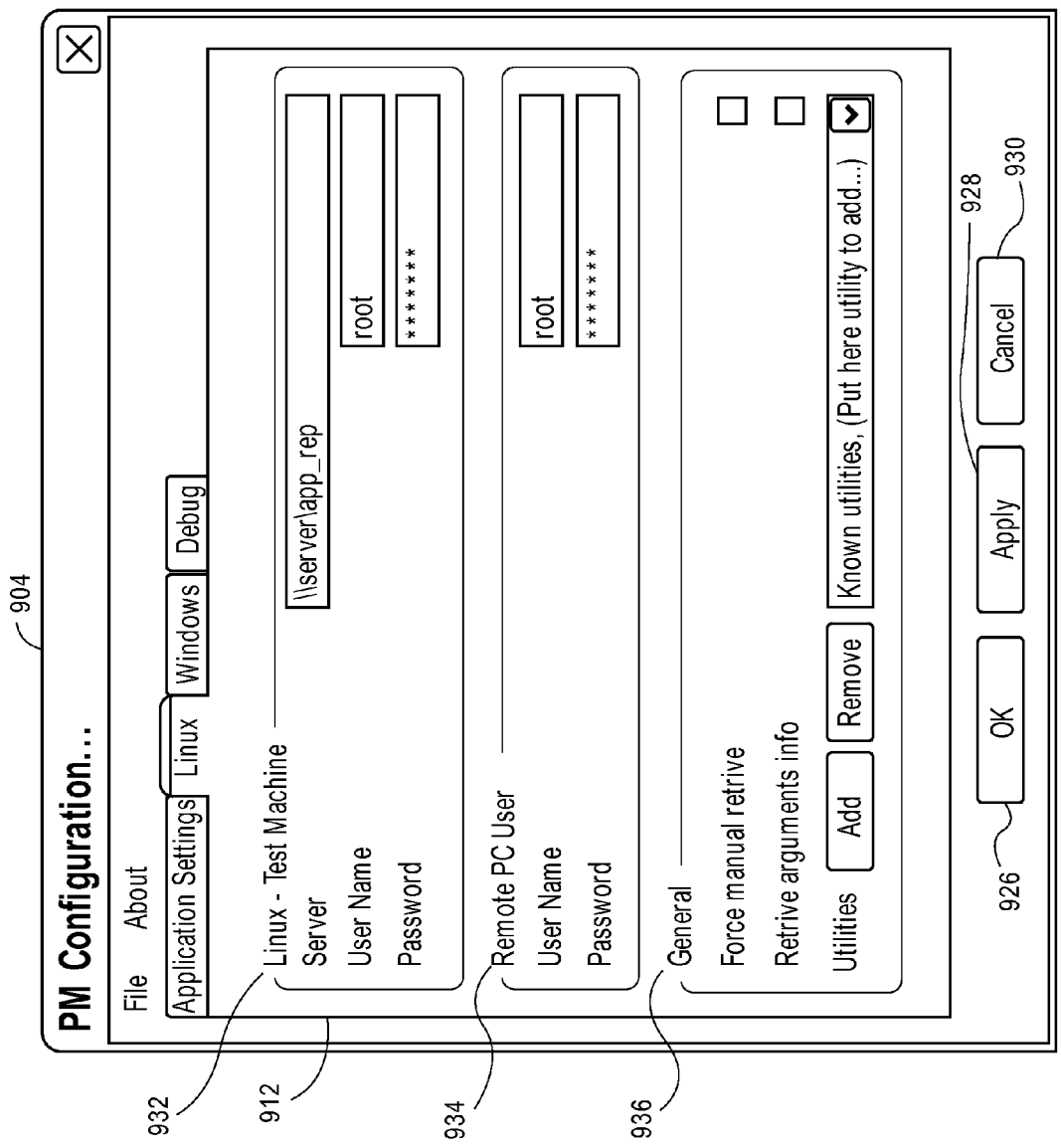
Figure 9C:
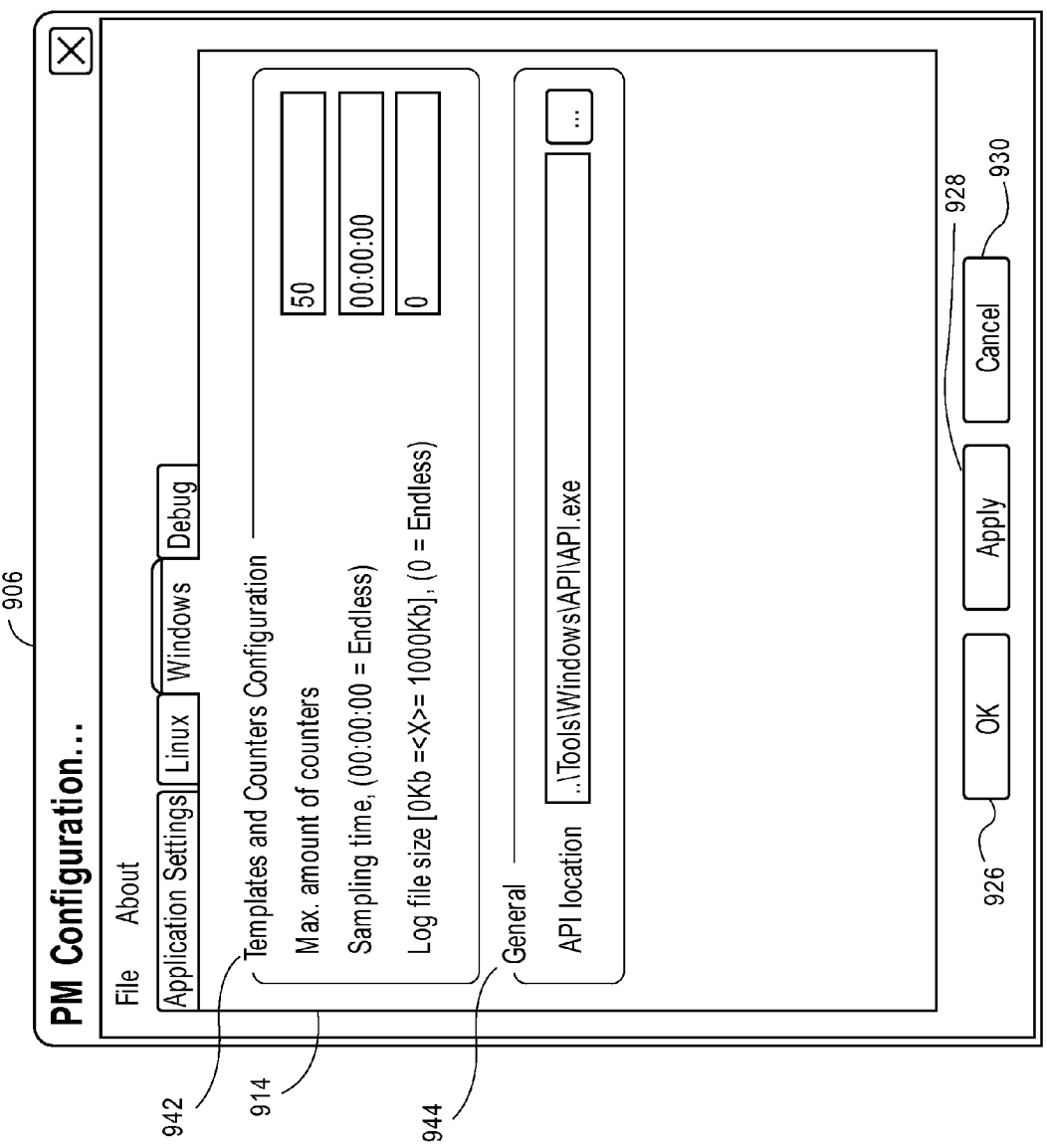
Figure 9D:
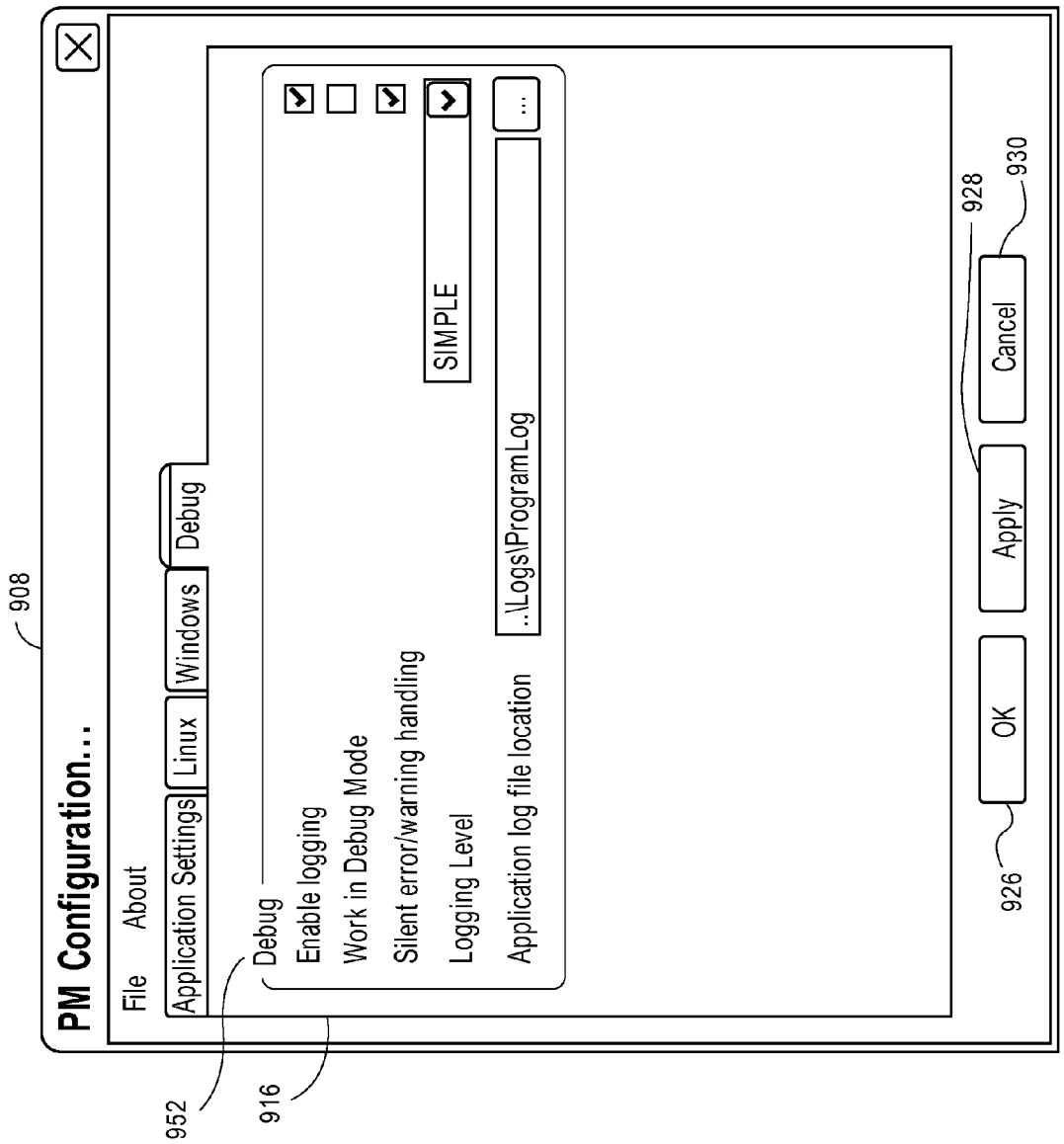

GUI-based display 904 of FIG. 9B illustrates performance monitor configuration settings having selected a Linux tab 912, while GUI-based display 906 of FIG. 9C illustrates performance monitor configuration settings having a selected a Windows tab 914. Linux tab 912 provides the following sections: a Linux test machine section 932, a remote PC user section 934, and a general section 936. Windows tab 914 provides the following sections: a templates and counters configuration setting 942 (such as to choose a maximum number of counters, etc.) and a general section 944 (such as providing an option to select or find an interface location). FIG. 9D's GUI-based display 908 illustrates a debug tab 916 relating to performance monitor configuration-related debug information 952.

Figure 10:
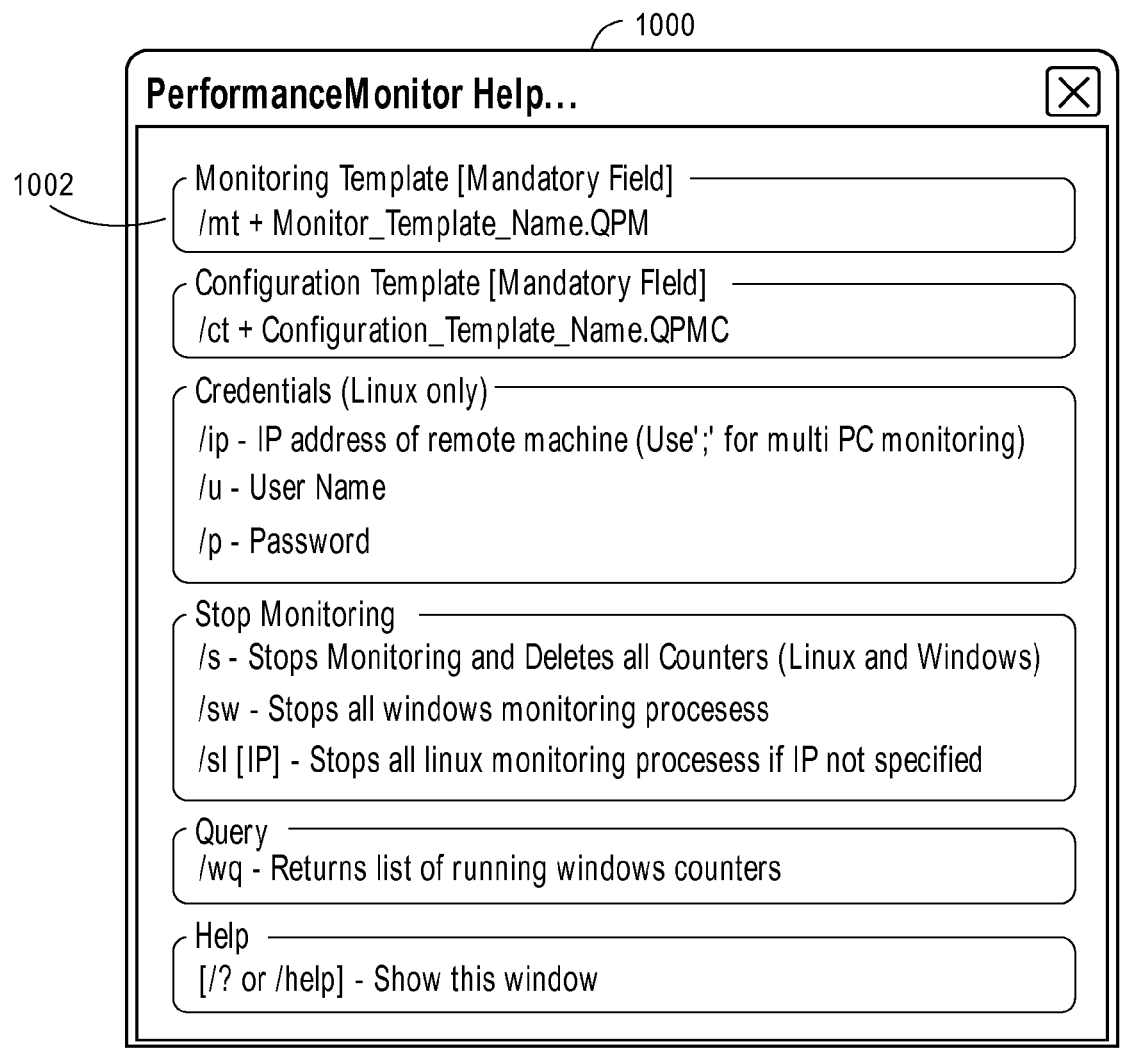
FIG. 10 illustrates a performance monitor command line interface or display according to one embodiment of the invention.

FIG. 10 illustrates a performance monitor command line interface or GUI-based display 1000 according to one embodiment of the invention. A user may use the performance monitor command line display 1000 to insert command lines to use a performance monitor. For example, section 1002 illustrates an exemplary command line for selecting a monitoring template.

Figure 11:
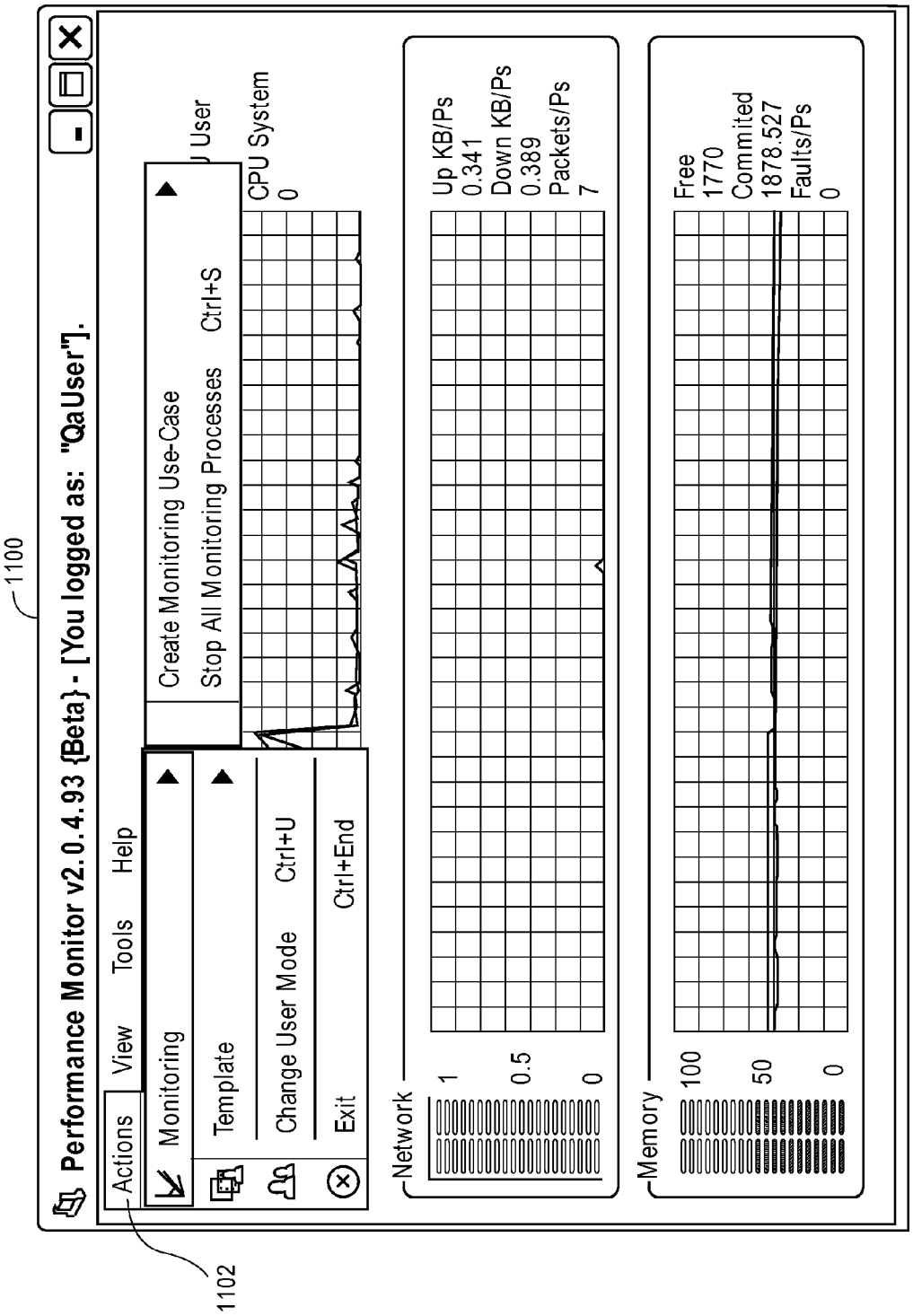
FIG. 11 illustrates a performance monitor GUI-based display according to one embodiment of the invention.

FIG. 11 illustrates a performance monitor GUI-based display 1100 according to one embodiment of the invention. GUI-based display 1100 shows a dropdown menu 1102 (e.g., selecting the actions tab as described in preceding Figures) to select various monitoring tasks relating a performance monitor and further shows various activity performances for system components, such as CPU, network, memory, etc. The dropdown menu 1102 may provide options for generating a Windows-based monitoring template or a Linux-based monitoring template, as described above with reference to FIG. 5D. Additionally, the dropdown menu 1102 may provide options for stopping monitoring processes as well as creating a new monitoring use-case.

Figure 12:
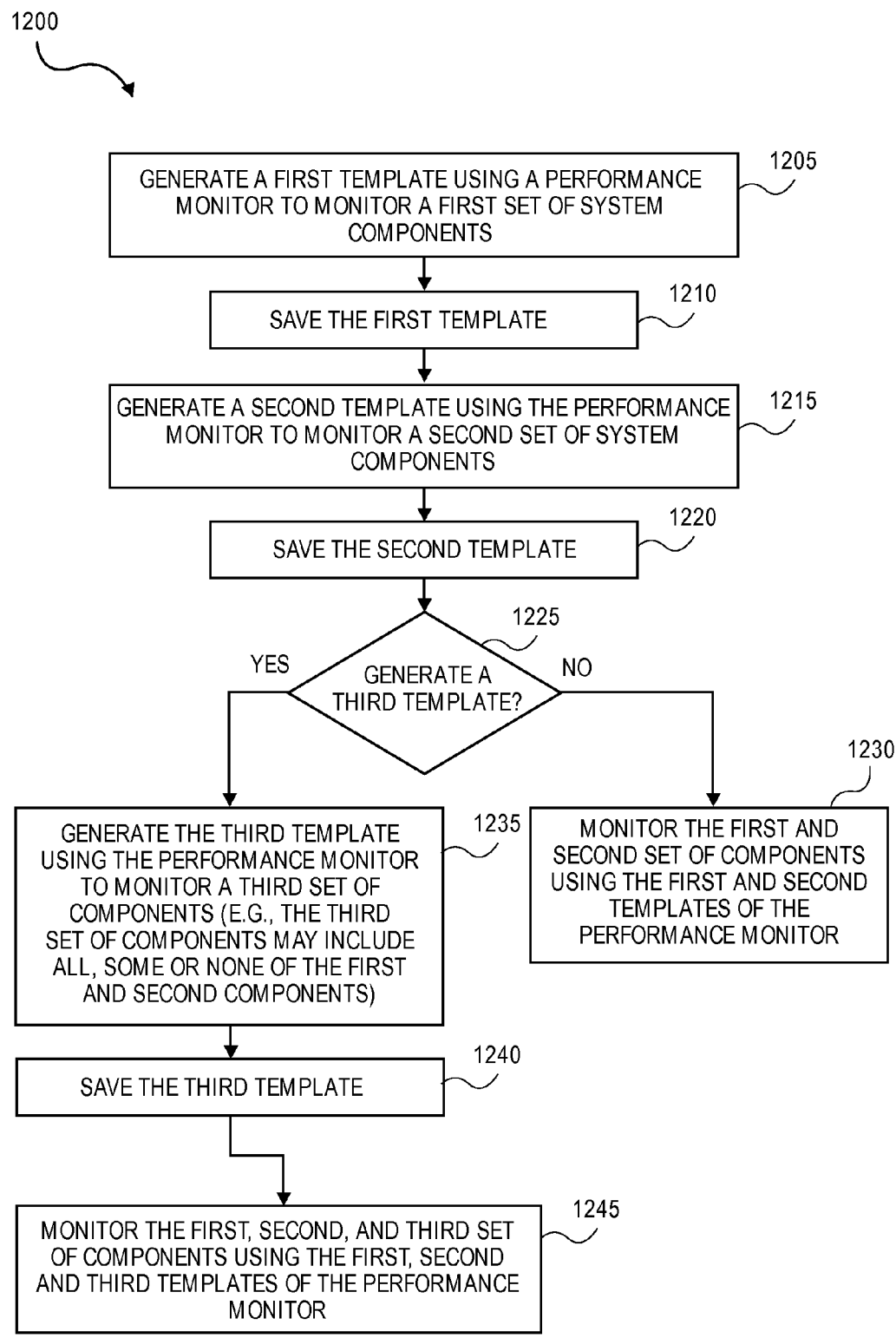
FIG. 12 illustrates a method for performing customized monitoring of system activities using a performance monitor according to one embodiment of the invention.

FIG. 12 illustrates a method for performing customized monitoring of system activities using a performance monitor according to one embodiment of the invention. Methods 1200 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 1200 is performed by performance monitor of FIG. 1.

Method 1200 begins at block 1205 with a first monitoring template, using a performance monitor, being generated to monitor activities of a first set of system components (e.g., activities/components relating to CPU). At block 1210, the first monitoring template is saved. At block 1215, a second monitoring template is generated, using the performance monitor, to perform monitoring of a second set of system components (e.g., activities/components relating to memory). At block 1220, the second monitoring template is also saved. Although, in this case, both the first and second monitoring templates are saved, as aforementioned, a monitoring template may be created for a single run and destroyed once the run is completed. Further, these monitoring templates may be generated to use existing system monitoring tools, or to create a new monitoring tool such that a monitoring template facilitates the performance monitor to monitor certain activities for which a monitoring tool is not provided, or to use and consolidate the existing monitoring tools such that the performance monitor serves as a universal monitoring tool.

At block 1225, a determination is made as to whether a third monitoring template be generated. If not, the first and second monitoring templates are run to perform their respective monitoring tasks at block 1230. If a third monitoring template is to be generated, it is generated at block 1235. The third monitoring template may be generated to monitor another set of components (e.g., activities/components relating to virtual machines) or customized to be responsible for monitoring some or all of the components of the first monitoring template and/or the second monitoring template. At block 1240, the third monitoring template is saved. At block 1245, the three monitoring templates are executed to perform their respective system monitoring tasks.

Figure 13:
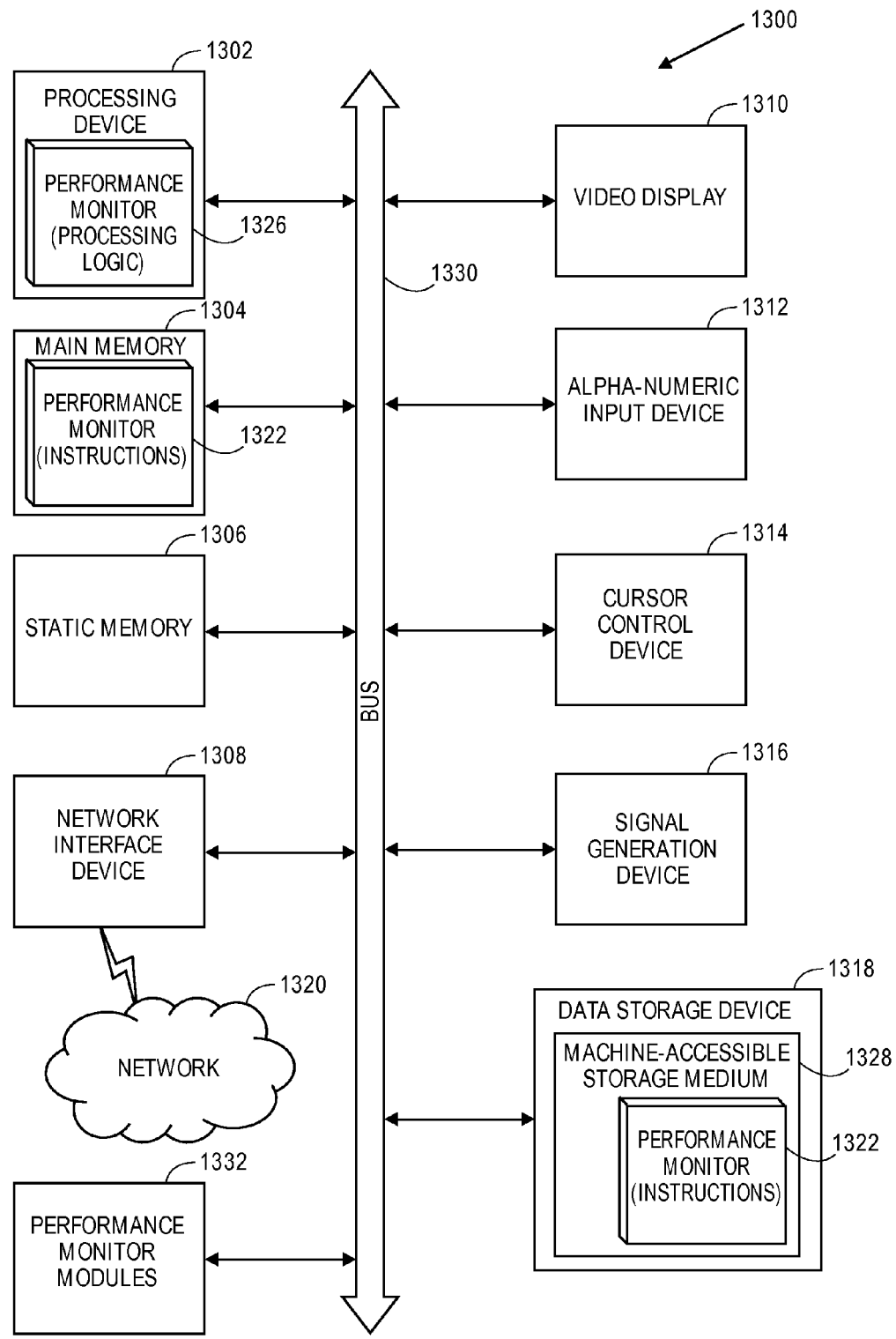
FIG. 13 is a block diagram illustrating one embodiment of a computer system.

FIG. 13 is a block diagram of a computer system 1300 for performing customized monitoring of system activities using a performance monitor according to one embodiment of the invention. Within the computer system 1300 is a set of instructions for causing the machine to perform any one or more of the methodologies discussed herein. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1300 includes a processing device 1302, a main memory 1304 (e.g., read-only memory (ROM), flash memory, random access memory (RAM), dynamic RAM (DRAM) such as synchronous DRAM (SDRAM), DRAM (RDRAM), etc.), a static memory 1306 (e.g., flash memory, static random access memory (SRAM), etc.), and a secondary memory 1318 (e.g., a data storage device in the form of a drive unit, which may include fixed or removable machine-accessible or computer-readable storage medium), which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. Processing device 1302 is configured to execute the processing logic 1326 for performing the operations and methods discussed herein.

The computer system 1300 may further include a network interface device 1308. The computer system 1300 also may include a video display unit 1310 (e.g., a liquid crystal display (LCD) or a cathode ray tube (CRT)) connected to the computer system through a graphics port and graphics chipset, an alphanumeric input device 1312 (e.g., a keyboard), a cursor control device 1314 (e.g., a mouse), and a signal generation device 1316 (e.g., a speaker).

The data storage device 1318 may include a machine-accessible storage medium (or a computer-readable storage medium) 1328 on which is stored one or more sets of instructions 1322 (e.g., performance monitor) embodying any one or more of the methodologies or functions described herein. The performance monitor may also reside, completely or at least partially, within the main memory 1304 (e.g., performance monitor (instructions) 1322) and/or within the processing device 1302 (e.g., performance monitor (processing logic) 1326) during execution thereof by the computer system 1300, the main memory 1304 and the processing device 1302 also constituting machine-readable storage media.

The machine-readable storage medium 1328 may also be used to store the performance monitor (instructions) 1322 persistently. While the machine-accessible storage medium 1328 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Performance monitor modules 1332, components and other features described herein (for example in relation to FIG. 1) can be implemented as discrete hardware components or integrated in the functionality of hardware components such as ASICS, FPGAs, DSPs or similar devices. In addition, the modules 1332 can be implemented as firmware or functional circuitry within hardware devices. Further, the modules 1332 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "installing", "customizing", "adding", "selecting", generating", "searching", "researching", "creating", "choosing", "saving", "storing", "requesting", "executing", "loading", "monitoring", "throwing", "returning", "localizing", "enabling", "running", "rerunning", "determining", "detecting", "performing", "facilitating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as ROM, RAM, magnetic disk storage media, optical storage media, flash memory devices, etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    establishing, by a first computing device, a first secure channel between the first computing device and a second computing device, and a second secure channel between the first computing device and the second computing device;
    identifying, by a processing device of the first computing device, a first monitoring tool to monitor one or more virtual machines and a second monitoring tool to monitor one or more physical devices;
    determining, by the processing device, that the second computing device includes the first monitoring tool and does not include the second monitoring tool; and
    transmitting to the second computing device an executable that is different than the first monitoring tool and the second monitoring tool and that, when executed by the second computing device, causes the second computing device to: execute the first monitoring tool, direct output from the first monitoring tool to the first computing device via the first secure channel, obtain from a designated location the second monitoring tool, install the second monitoring tool, execute the second monitoring tool, and direct output from the second monitoring tool to the first computing device via the second secure channel.

2. The method of claim 1, wherein the first computing device includes a first operating system and the second computing device includes a second operating system that is different from the first operating system.

3. The method of claim 1, wherein the executable, when executed by the second computing device, further causes the second computing device to replace a first version of the first monitoring tool with a second version of the first monitoring tool.

4. The method of claim 1, wherein the executable, when executed by the second computing device, further causes the second computing device to reconfigure the first monitoring tool.

5. The method of claim 1, wherein the one or more physical devices comprises one or more processors.

6. The method of claim 1, wherein the one or more physical devices comprises a memory.

7. A non-transitory computer-readable medium including instructions that, when executed by a processing device of a first computing device, cause the processing device to:
    establish a first secure channel between the first computing device and a second computing device, and a second secure channel between the first computing device and the second computing device;
    identify, by the processing device, a first monitoring tool to monitor one or more virtual machines and a second monitoring tool to monitor one or more physical devices;
    determine, by the processing device, that the second computing device includes the first monitoring tool and does not include the second monitoring tool; and
    transmit to the second computing device an executable that is different than the first monitoring tool and the second monitoring tool and that, when executed by the second computing device, causes the second computing device to: execute the first monitoring tool, direct output from the first monitoring tool to the first computing device via the first secure channel, obtain from a designated location the second monitoring tool, install the second monitoring tool, execute the second monitoring tool, and direct output from the second monitoring tool to the first computing device via the second secure channel.

8. The non-transitory computer-readable medium of claim 7, wherein the first computing device includes a first operating system and the second computing device includes a second operating system that is different from the first operating system.

9. The non-transitory computer-readable medium of claim 7, wherein the executable, when executed by the second computing device, further causes the second computing device to obtain and install the first monitoring tool.

10. The non-transitory computer-readable medium of claim 7, wherein the executable, when executed by the second computing device, further causes the second computing device replace a first version of the first monitoring tool with a second version of the first monitoring tool.

11. The non-transitory computer-readable medium of claim 7, wherein the executable, when executed by the second computing device, further causes the second computing device to reconfigure the first monitoring tool.

12. The non-transitory computer-readable medium of claim 7, wherein the one or more physical devices comprises one or more processors.

13. The non-transitory computer-readable medium of claim 7, wherein the one or more physical devices comprises a memory.

14. A first computing device, comprising:
    a network interface device; and
    a processing device, operatively coupled to the network interface device, to:
        establish a first secure channel between the first computing device and a second computing device, and a second secure channel between the first computing device and the second computing device;
        identify a first monitoring tool to monitor one or more virtual machines and a second monitoring tool to monitor one or more physical devices;
        determine that the second computing device includes the first monitoring tool and does not include the second monitoring tool; and
        transmit to the second computing device, via the network interface, an executable that is different than the first monitoring tool and the second monitoring tool and that, when executed by the second computing device, causes the second computing device to: execute the first monitoring tool, direct output from the first monitoring tool to the first computing device via the first secure channel, obtain from a designated location the second monitoring tool, install the second monitoring tool, execute the second monitoring tool, and direct output from the second monitoring tool to the first computing device via the second secure channel.

15. The first computing device of claim 14, wherein the first computing device includes a first operating system and the second computing device includes a second operating system that is different from the first operating system.

16. The first computing device of claim 14, wherein the executable, when executed by the second computing device, further causes the second computing device to replace a first version of the first monitoring tool with a second version of the first monitoring tool.

17. The first computing device of claim 14, wherein the executable, when executed by the second computing device, further causes the second computing device to reconfigure the first monitoring tool.

18. The first computing device of claim 14, wherein the one or more physical devices comprises one or more processors.

19. The system of claim 14, wherein the one or more physical devices comprises a memory.

\* \* \* \* \*